(12) United States Patent
Shimomura et al.

(10) Patent No.: US 9,268,120 B2
(45) Date of Patent: Feb. 23, 2016

(54) ZOOM LENS AND IMAGE PICKUP APPARATUS INCLUDING THE SAME

(71) Applicant: CANON KABUSHIKI KAISHA, Tokyo (JP)

(72) Inventors: Kazuya Shimomura, Utsunomiya (JP); Tomoyuki Nakamura, Utsunomiya (JP); Yu Inomoto, Saitama (JP); Tsuyoshi Wakazono, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/534,523

(22) Filed: Nov. 6, 2014

(65) Prior Publication Data

US 2015/0130968 A1 May 14, 2015

(30) Foreign Application Priority Data

Nov. 12, 2013 (JP) ................................. 2013-234389

(51) Int. Cl.
| | |
|---|---|
| *G02B 15/14* | (2006.01) |
| *G02B 15/24* | (2006.01) |
| *G02B 15/173* | (2006.01) |
| *G02B 13/00* | (2006.01) |
| *G02B 15/20* | (2006.01) |
| *H04N 5/232* | (2006.01) |
| *H04N 5/369* | (2011.01) |

(52) U.S. Cl.
CPC .............. *G02B 15/24* (2013.01); *G02B 13/009* (2013.01); *G02B 15/14* (2013.01); *G02B 15/173* (2013.01); *G02B 15/20* (2013.01); *H04N 5/23296* (2013.01); *H04N 5/369* (2013.01)

(58) Field of Classification Search
CPC ....... G02B 15/14; G02B 15/16; G02B 15/173; G02B 15/20; G02B 15/24; G02B 15/28
USPC ................................................... 359/686–690
See application file for complete search history.

(56) References Cited

U.S. PATENT DOCUMENTS

2007/0058264 A1  3/2007  Yakita
2012/0320251 A1* 12/2012  Saito .................... G02B 15/173
                                                        348/340

FOREIGN PATENT DOCUMENTS

JP    2002-169091 A    6/2002
JP    2007-078833 A    3/2007

OTHER PUBLICATIONS

European Search Report issued in corresponding application No. 14003765.6 on Mar. 20, 2015.

* cited by examiner

*Primary Examiner* — William Choi
(74) *Attorney, Agent, or Firm* — Carter, DeLuca, Farrell & Schmidt, LLP

(57) ABSTRACT

Provided is a zoom lens including, in order from an object side to an image side: a first lens unit having a positive refractive power which does not move for zooming; a second lens unit having a negative refractive power which moves during zooming; and an N-th lens unit having a positive refractive power which does not move for zooming and is arranged closest to the image side. In the zoom lens, the N-th lens unit includes in order from an object side: a first sub-lens unit; and a second sub-lens unit which is movable, and a lateral magnification at a wide angle end of the N-th lens unit and a lateral magnification at a wide angle end of the second sub-lens unit of the N-th lens unit when an axial ray enters from infinity in a state in which focus is at the infinity are appropriately set.

10 Claims, 11 Drawing Sheets

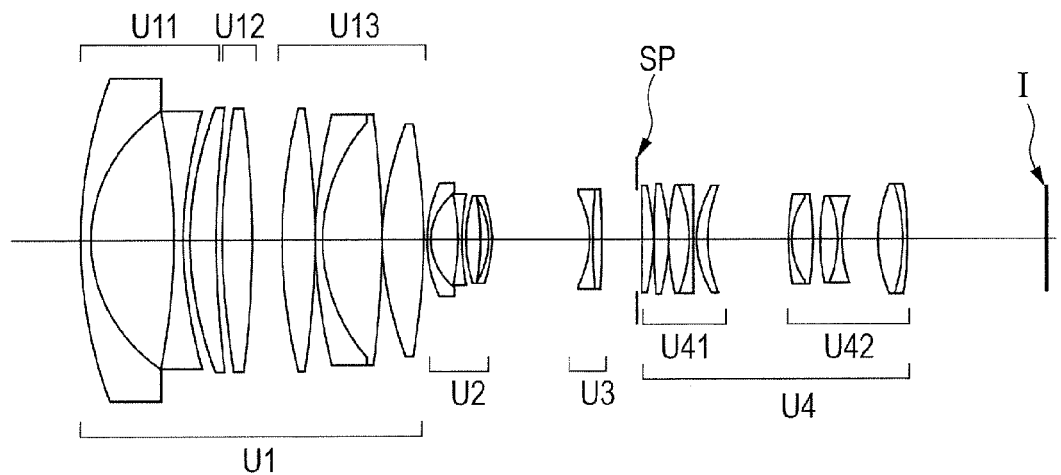
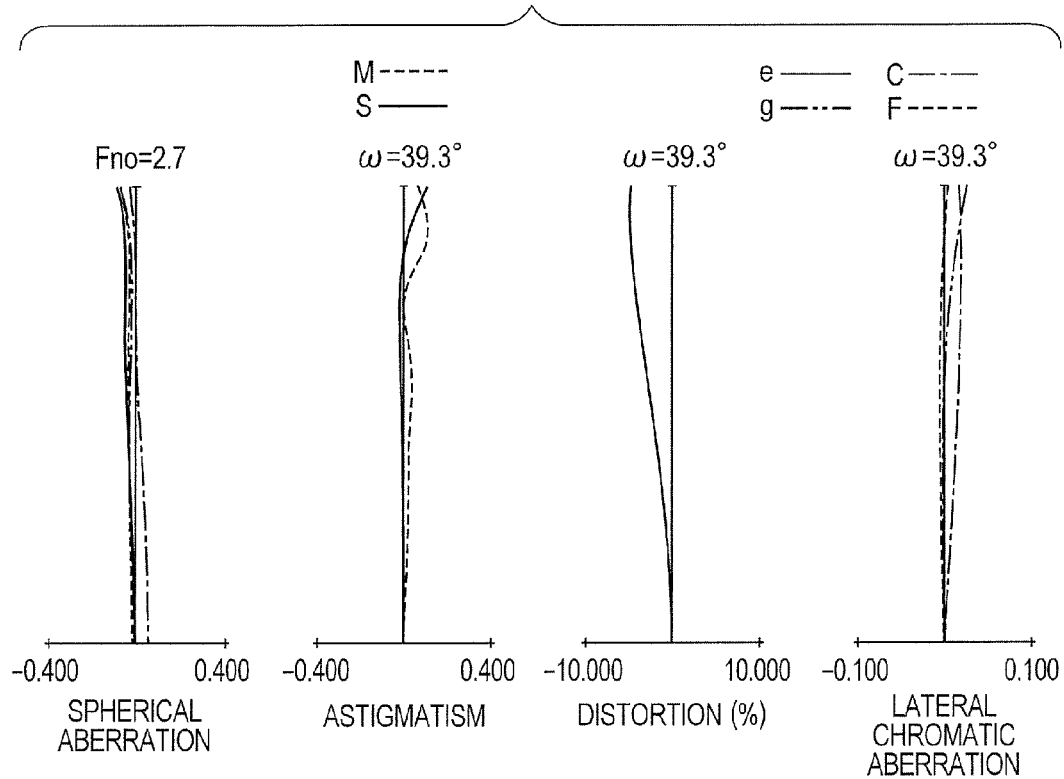

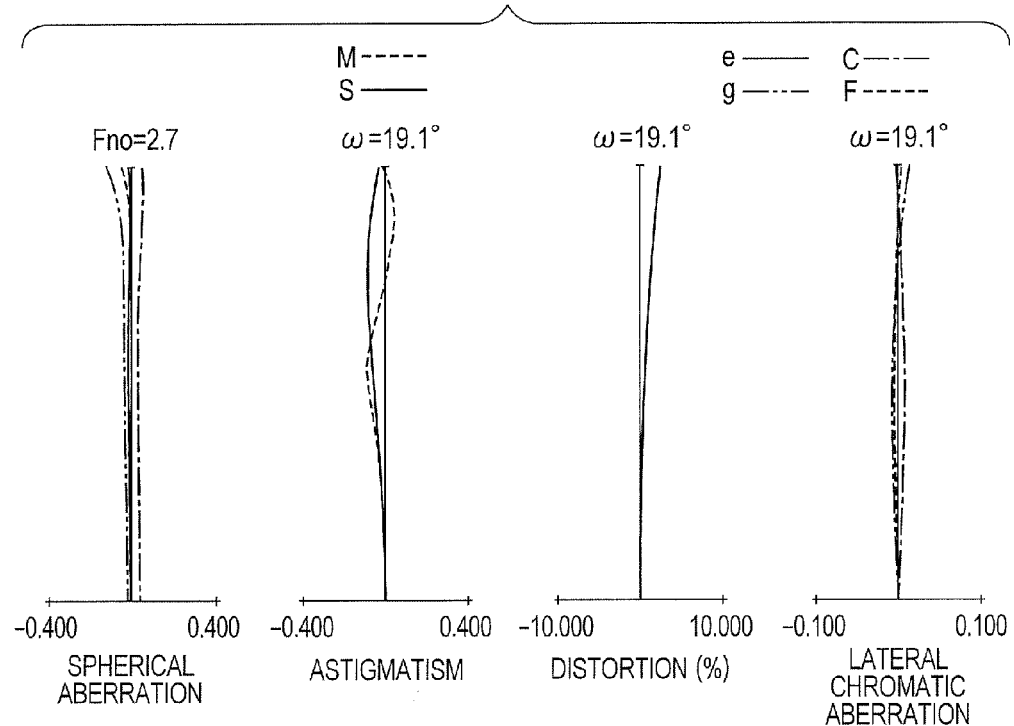
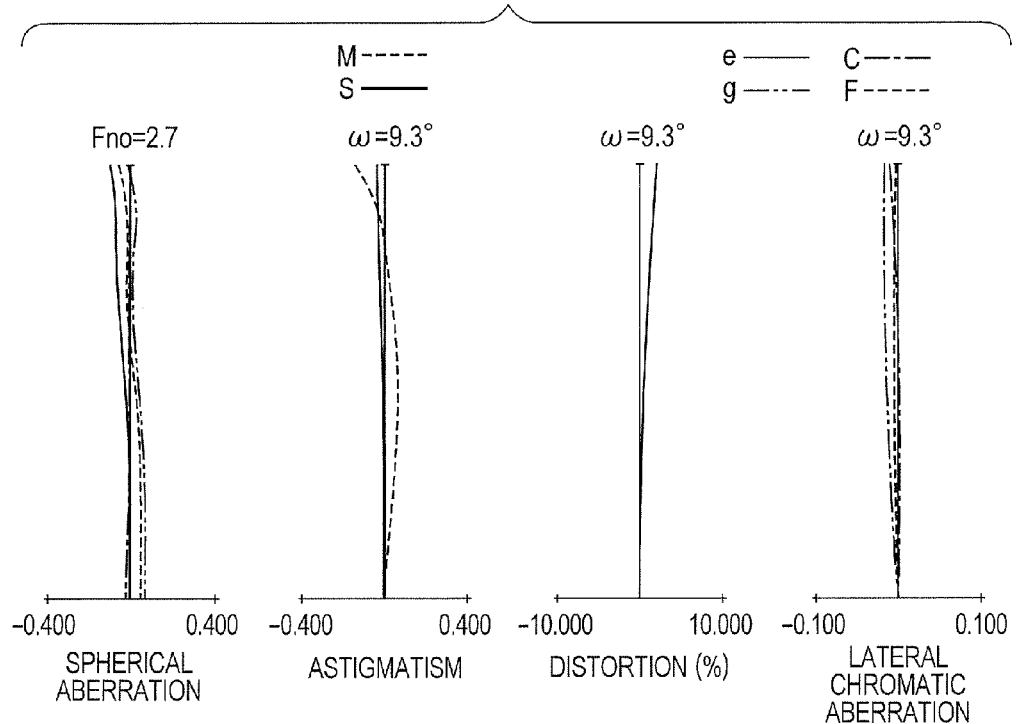

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, and more particularly, to a zoom lens suited for use in a broadcasting television camera, a cinema camera, a video camera, a digital still camera, and a silver-halide film camera.

2. Description of the Related Art

In recent years, a zoom lens having a wide angle of field, a high zoom ratio, and high optical performance is desired for use in an image pickup apparatus, such as a television camera, a cinema camera, a film camera, or a video camera. In particular, an image pickup device such as a charge coupled device (CCD) or a complementary metal oxide semiconductor (CMOS) used in a television or cinema camera as a professional moving image pickup system has a substantially uniform resolution over the entire image pickup range. Therefore, a zoom lens using the image pickup device is required to have a substantially uniform resolution from the center to the periphery of the screen. There are also needs for reductions in size and weight for an image pickup mode that places emphasis on mobility and operability.

In addition, a macro-photographing mechanism for enabling proximity photographing by moving a lens unit different from a focusing lens unit in an optical axis direction, and a flange back adjusting mechanism for adjusting a distance from a reference surface to which a lens mount is mounted to an image plane are highly requested for an interchangeable lens for a television camera or a movie camera.

As a zoom lens having a wide angle of field and a high zoom ratio, there is known a positive-lead type zoom lens in which a first lens unit having a positive refractive power and a second lens unit having a negative refractive power for variable power are arranged in order from an object side.

For example, in each of Japanese Patent Application Laid-Open Nos. 2002-169091 and 2007-78833, there is disclosed a zoom lens including, in order from an object side, a first lens unit having a positive refractive power, a second lens unit having a negative refractive power, a third lens unit having a positive or negative refractive power, and a fourth lens unit having a positive refractive power. In Numerical Embodiments of each of Japanese Patent Application Laid-Open Nos. 2002-169091 and 2007-78833, a lens unit movable for macro photography or flange back adjustment is provided within the fourth lens unit, which is arranged closer to an image side than a stop.

In order to achieve all, of a wide angle of field, a high zoom ratio, and high optical performance in the positive-lead type zoom lens, it is important to appropriately set an arrangement of the refractive powers of the lenses. In particular, because the lens unit closest to the image side plays a role of determining a size of all the lenses closer to the object side than the lens unit closest to the image side, in order: to achieve both of the optical performance and the reduction in size, it is important to appropriately set the lateral magnification of the lens unit closest to the image side. In addition, in order to mount the macro-photographing mechanism or the flange back adjusting mechanism to the positive-lead type zoom lens, the lens units, which are to be moved in an optical axis direction when the macro photography or the flange back adjustment is carried out, needs to have a moderate position sensitivity to back focus.

However, in the zoom lens disclosed in each of Japanese Patent Application Laid-Open Nos. 2002-169091 and 2007-78833, a relatively small-sized image pickup element (having a diagonal of 11 mm) for the television camera is supposed, and hence the lateral magnification of the lens unit closest to the image side is small. For this reason, if this zoom lens is applied to an image pickup element (having a diagonal of 25 mm or more) which has been increased in size in recent years, a lens diameter is increased in proportion to the increase in size of the image pickup element. In particular, in such a zoom lens that an angle of field at a wide angle end exceeds 70°, the increase in size of the lens unit closest to the object side becomes remarkable.

SUMMARY OF THE INVENTION

In view of the foregoing, the present invention provides a small and lightweight zoom lens that has a wide angle of field, a high zoom ratio, and high optical performance over an entire zoom range by approximately setting a refractive power of each lens unit, and a refractive power of each sub-lens unit within a lens unit closest to an image side, and includes a macro-photographing mechanism or a flange back adjusting mechanism. Specifically, the present invention provides a small, lightweight, and high-performance zoom lens in which an angle of field at a wide angle end is in the range of from approximately 70° to 95°, an angle of field at a telephoto end is in the range of from approximately 10° to 25°, and a zoom ratio in the range of from approximately 5 to 10.

In order to achieve the above-mentioned object, according to one embodiment of the present invention, there is provided a zoom lens, including, in order from an object side to an image side a first lens unit having a positive refractive power which does not more for zooming; a second lens unit having a negative refractive power which moves during zooming; and an N-th lens unit having a positive refractive power which does not move for zooming and is arranged closest, to the image side, in which the N-th lens unit includes in order from an object side to an image side: a first sub-lens unit; and a second sub-lens unit configured to be able to move in an optical axis direction, and the following conditional expressions are satisfied:

$$-2.70 < \beta nw < -1.45; \text{ and}$$

$$0 < \beta n2 < 0.75,$$

where βnw represents a lateral magnification at a wide angle end of the N-th lens unit and βn2 represents lateral magnification at a wide angle end of the second sub-lens unit when an axial ray enters from infinity in a state in which focus is at the infinity.

According to one embodiment of the present invention, by appropriately setting the refractive power of each lens unit and the refractive power of each sub-lens unit within the lens unit closest to the image side, it is possible to obtain the small and lightweight zoom lens which has the wide angle of field, the high zoom ratio, and the high optical performance over the entire zooming range, and includes the macro-photographing mechanism or the flange back adjusting mechanism.

Further features of the present invention will become apparent from the following description of exemplary embodiments with reference to the attached drawings.

BRIEF DESCRIPTION OF THE DRAWINGS

FIG. 7 is a lens cross-sectional view in the state in which focus is at infinity at a wide angle end according to Numerical Embodiment 4.

FIG. 8A is an aberration diagram in the state in which focus is at infinity at the wide angle end according to Numerical Embodiment 4.

FIG. 8B is an aberration diagram in the state in which focus is at infinity at an intermediate zoom position according to Numerical Embodiment 4.

FIG. 8C is an aberration diagram in the state in which focus is at infinity at a telephoto end according to Numerical Embodiment 4.

DESCRIPTION OF THE EMBODIMENTS

Figure 1:
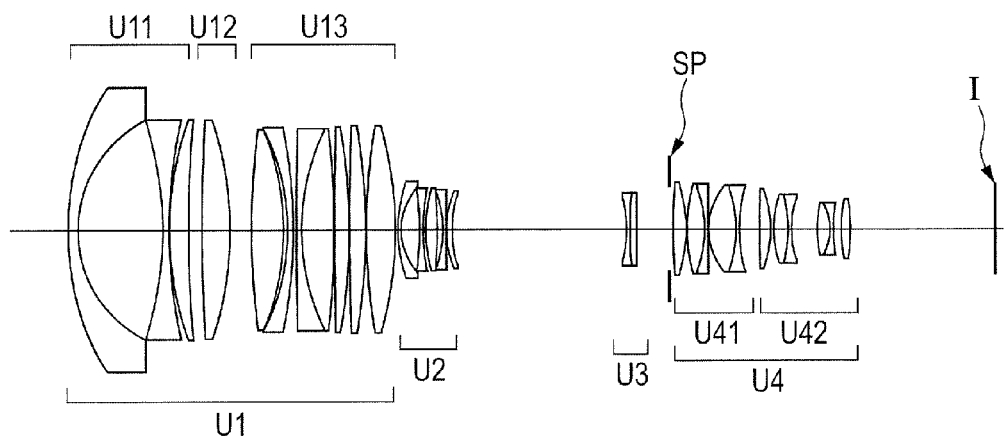
FIG. 1 is a lens cross-sectional view in a state in which focus is at infinity at a wide angle end according to Numerical Embodiment 1.

Exemplary embodiments of the present invention are described in detail below with reference to the accompanying drawings.

First, features of a zoom lens according to the present invention are described along with conditional expressions. In order to attain a small and lightweight zoom lens which has a wide angle of field, a high zoom ratio, and high optical performance over the entire zooming range, and which includes a macro-photographing mechanism or a flange back adjusting mechanism, the zoom lens of the present invention has a feature in that a lateral magnification of an N-th lens unit closest to an image side is defined.

The zoom lens of the present invention includes, in order from an object side to an image side, a first lens unit having a positive refractive power which does not move for zooming (variable power), a second lens unit, having a negative power which moves during zooming, and an N-th lens unit having a positive refractive power which does not move for zooming and is arranged closest to the image side. In addition, the N-th lens unit includes a first sub-lens unit, and a second sub-lens unit which is movable for macro photography or flange back adjustment. In this case, the following conditional expressions are satisfied:

$$-2.70 < \beta nw < -1.45; \text{ and} \quad (1)$$

$$0 < \beta n2 < 0.75, \quad (2)$$

where $\beta nw$ and $\beta n2$ respectively represent lateral magnifications at wide angle ends of the N-th lens unit and the second sub-lens unit of the N-th lens unit when an axial ray enters from infinity in a state in which focus is at the infinity.

The conditional expression (1) defines the lateral magnification at the wide angle end of the N-th lens unit. By satisfying the conditional expression (1), the zoom lens having the reduced size and weight, and the high optical performance is attained. If the condition of an upper limit of the conditional expression (1) is not satisfied, the lens diameter of each lens unit closer to the object side than the N-th lens unit, in particular, the first lens unit is increased, and hence it becomes difficult to reduce the size and weight of the zoom lens. On the other hand, if the condition of a lower limit of the conditional expression (1) is not satisfied, a ratio at which an image formed by the lens units closer to the object side than the N-th lens unit is enlarged by the N-th lens unit is increased. For this reason, in particular, the various aberrations generated in the first lens unit are increased, and hence it becomes difficult to correct the chromatic aberration at the telephoto end. It is more preferred to set the conditional expression (1) as follows.

$$-2.40 < \beta nw < -1.55 \quad (1a)$$

In addition, the conditional expression (2) defines the lateral magnification of the second sub-lens unit of the N-th lens unit. By satisfying the conditional expression (2), the second sub-lens unit of the N-th lens unit has the moderate position sensitivity to the back focus for the macro photography or the flange back adjustment, and the high optical performance. Here, the following expression approximately holds:

$$skn2 = 1 - \beta n2^2 \quad (11)$$

where skn2 represents a change amount of back focus per unit movement amount of the second sub-lens unit of the N-th lens unit in the optical axis direction.

If the condition of an upper limit of the conditional expression (2) is not satisfied, a value of skn2 in the expression (11) is small, and hence it is difficult for the second sub-lens unit of the N-th lens unit to have the moderate position sensitivity to the back focus. As a result, the movement amount of the second sub-lens unit of the N-th lens unit in the optical axis direction when the macro photography or the flange back adjustment is carried out is increased, which leads to the increase in size of the N-th lens unit. If the condition of a lower limit of the conditional expression (2) is not satisfied, the light entering the second sub-lens unit of the N-th lens unit diverges, which increases the lens diameter of the second sub-lens unit of the N-th lens unit. For this reason, the refractive power of the lens constructing the second sub-lens unit of the N-th lens unit becomes strong, which makes it difficult to correct the high-order aberration. It is further preferred to set the conditional expression (2) as follows.

$$0.35 < \beta n2 < 0.70 \quad (2a)$$

In a zoom lens of another embodiment of the present invention, a ratio of a focal length of the first sub-lens unit of the N-th lens unit to a focal length of the second sub-lens unit of the N-th lens unit is defined. In this case, the following conditional expression is satisfied:

$$0 < fn1/fn2 < 0.45, \quad (3)$$

where fn1 represents the focal length of the first sub-lens unit of the N-th lens unit, and fn2 represents the focal length of the second sub-lens unit of the N-th lens unit. By satisfying the conditional expression (3), the high optical performance at the wide angle end is attained. If the condition of an upper limit of the conditional expression (3) is not satisfied, the refractive power of the second sub-lens unit of the N-th lens unit is increased, and hence it becomes difficult to correct off-axial aberration such as coma and field curvature at the wide angle end. On the other hand, if the condition of a lower limit of the conditional expression (3) is not satisfied, the refractive power of the first sub-lens unit of the N-th lens unit is increased. For this reason, the curvatures of the lenses constructing the first sub-lens unit of the N-th lens unit become strong. In particular, the high-order aberration of the spherical aberration at the wide angle end becomes difficult to correct. It is further preferred to set the conditional expression (3) as follows.

$$0.15 < fn1/fn2 < 0.40 \quad (3a)$$

In a zoom lens of another embodiment of the present invention, a ratio of a focal length of the lens closest to the image side of the first sub-lens unit of the N-th lens unit to a focal length of the first sub-lens unit of the N-th lens unit is defined. The lens closest to the image side of the first sub-lens unit of the N-th lens unit is a convex lens or a cemented lens, and satisfies the following conditional expression:

$$|fn1/fn11| < 0.3, \quad (4)$$

where fn11 represents a focal length of the lens closest to the image side of the first sub-lens unit of the N-th lens unit. By satisfying the conditional expression, the high optical performance at the wide angle end is attained. On the other hand, if the conditional expression (4) is not satisfied, the refractive power of the lens closest to the image side of the first sub-lens unit of the N-th lens unit becomes strong, and hence the curvature of the lens becomes strong. For this reason, the high-order aberration of the spherical aberration at the wide angle end becomes difficult to correct. In addition, because the influence of the manufacturing error on the optical performance becomes large, the characteristic deterioration due to the manufacturing variations is increased. It is further preferred to set the conditional expression (4) as follows.

$$0.01 < |fn1/fn11| < 0.25 \quad (4a)$$

In a zoom lens of another embodiment of the present invention, an Abbe number (Abbe constant) and a partial dispersion ratio with respect to d-line of an optical material to be used for the second sub-lens unit of the N-th unit are defined, in this case, the following conditional expressions are satisfied:

$$0.58 < \theta 2 < 0.70; \quad (5)$$

$$15 < vd2 < 30; \text{ and} \quad (6)$$

$$65 < vd2a < 85, \quad (7)$$

where vd2 and θ2 respectively represent an Abbe number and a partial dispersion ratio of a first convex lens having the smallest Abbe number among the convex lenses included in the second sub-lens unit of the N-th lens unit, and vd2a represents an average Abbe number of the convex lenses other than the first convex lens, Here, the Abbe number with respect to the d-line and the partial dispersion ratio of a material of an optical device (lens) used in the present invention are defined as follows. Refractive indices with respect to g-line (435.8 nm), F-line (486.1 nm), d-line (587.6 nm), and C-line (656.3 nm) of Fraunhofer line are denoted by Ng, NF, Nd, and NC, respectively. The Abbe number vd with respect to the d-line and a partial dispersion ratio θgF with respect to the g-line and the F-line are defined by the following expressions, $$vd = (Nd-1)/(NF-NC) \quad (i)$$

$$\theta gF = (Ng-NF)/(NF-NC) \quad (ii)$$

The partial dispersion ratio θgF of an existing optical material is present in a narrow range with respect to the Abbe number vd with respect to the d-line. Further, the existing optical material has a tendency that, as the Abbe number vd becomes larger, the refractive index becomes lower, that is, as the Abbe number vd becomes smaller, the partial dispersion ratio θgF becomes greater. Here, a condition for correcting a chromatic aberration in a thin contact lens system including two lenses 1 and 2 having refractive powers $\phi 1$ and $\phi 2$ and Abbe numbers $v1$ and $v2$, respectively, is expressed by the following expression.

$$\phi 1/v1 + \phi 2/v2 = E \quad (iii)$$

In this case, a combined refractive power $\phi$ of the lenses 1 and 2 is expressed by the following expression.

$$\phi = \phi 1 + \phi 2 \quad (iv)$$

When E=0 is satisfied in expression (iii), in correcting the chromatic aberration, imaging positions of the C-line and the F-line match each other. At this time, $\phi 1$ and $\phi 2$ are expressed, by the following expressions.

$$\phi 1 = \phi \times v1/(v1-v2) \quad (v)$$

$$\phi 2 = \phi \times v2/(v1-v2) \quad (vi)$$

Figure 11:
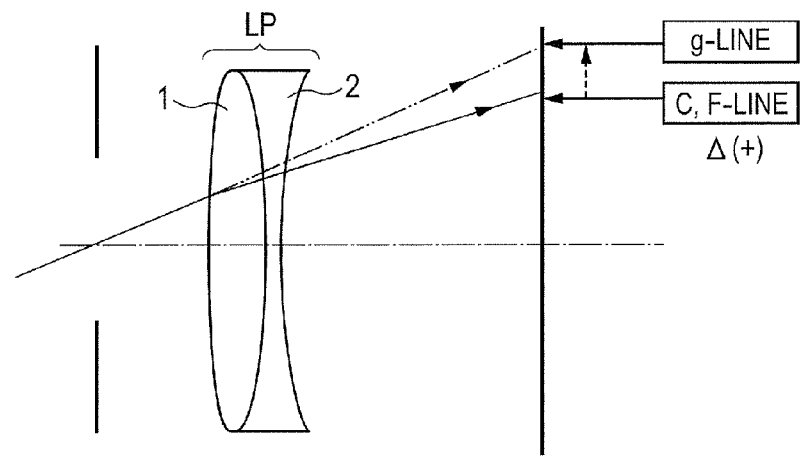
FIG. 11 is a schematic diagram of primary chromatic aberration correction and a residual secondary spectrum of a lateral chromatic aberration of a positive lens unit.

FIG. 11 is a schematic diagram of primary chromatic aberration correction and a residual secondary spectrum of a lateral chromatic aberration of a lens unit LP having a positive refractive power arranged between an image plane and an aperture stop. When the chromatic aberration of the positive lens unit LP illustrated in FIG. 11 is corrected, a material having a large Abbe number v1 is used for a positive lens 1, and a material, having a small Abbe number v2 is used for a negative lens 2. Therefore, the positive lens 1 has a small partial dispersion ratio θ1 and the negative lens 2 has a large partial, dispersion ratio θ2 When the primary chromatic aberration is corrected for the C-line and the F-line, an imaging point, of the g-line deviates a direction separated away from the optical axis. If a deviation amount of the lateral chromatic aberration of the g-line with respect to the C-line and the L-line is defined as a secondary spectrum amount ΔY, the secondary spectrum amount. ΔY is expressed by the following expression.

$$\Delta Y = (1/\phi) \times (\theta 1 - \theta 2)/(v1 - v2) \quad \text{(vii)}$$

In order to satisfactorily correct the secondary spectrum of the lateral chromatic aberration at the wide angle end, necessary to adjust an amount of the secondary spectrum of the lateral chromatic aberration generated in the second sub-lens unit of the N-th lens unit in which the secondary spectrum is remarkably generated. The second sub-lens unit of the N-th lens unit has the positive refractive power. Hence, in to satisfactorily correct the secondary spectrum of the lateral chromatic aberration at the wide angle end, it is necessary to select such a glass material as to reduce the secondary spectrum amount ΔY generated in the second sub-lens unit of the N-th lens unit.

The condition of the conditional expression (5) is defined in order to satisfactorily correct the lateral chromatic aberration over the entire zoom range. If the condition of an upper limit of the conditional expression (5) is not satisfied, the secondary spectrum of the lateral chromatic aberration at the wide angle end is overcorrected, and hence it becomes difficult to satisfactorily correct the chromatic aberration over the entire zoom range. On the other hand, if the condition of a lower limit of the conditional expression (5) is not satisfied, an absolute value of the numerator of the expression (vii) becomes large. As a result, the secondary spectrum of the lateral chromatic aberration at the wide angle end is increased, and hence it becomes difficult to satisfactorily correct the chromatic aberration at the wide angle end. It is further preferred to set the conditional expression (5) as follows.

$$0.61 < \theta 2 < 0.68 \quad \text{(5a)}$$

The conditions of the conditional expressions (6) and (7) are defined in order to attain the primary chromatic aberration correction of the lateral chromatic aberration at the wide angle end, and the high optical performance. If the condition of an upper limit of the conditional expression (6) is not satisfied, the Abbe number of the first convex lens is increased, and hence the anomalous dispersion property of the first convex lens is reduced. As a result, the absolute value of the numerator of the expression (vii) becomes large, and hence the secondary spectrum of the lateral chromatic aberration at the wide angle end is increased. Hence, it becomes difficult to satisfactorily correct the chromatic aberration at the wide angle end. In addition, if the condition of an upper limit of the conditional expression (7) is not satisfied, the Abbe numbers of the convex lenses other than the first convex lens are increased, which leads to the selection of the glass material having the low refractive index. As a result, the curvatures of the convex lenses of the second sub-lens unit of the N-th lens unit become strong, and hence the high-order aberration becomes difficult to correct. If the conditions of lower limits of the conditional expressions (6) and (7) are not satisfied, denominators of the expressions (v) and (vi) become small, and the refractive powers of the convex lenses constructing the second sub-lens unit of the N-th lens unit, become strong. As a result, it becomes difficult to attain the high optical performance. It is further preferred to set the conditional expressions (6) and (7) as follows.

$$16 < vd2 < 27 \quad \text{(6a)}$$

$$70 < vd2a < 83 \quad \text{(7a)}$$

In a zoom lens of another embodiment of the present invention, the structure of the first lens unit and the refractive power of each sub-lens unit within the first lens unit are defined. The first lens unit includes a first sub-lens unit having a negative refractive power which does not move for focusing, a second sub-lens unit having a positive power which moves to the image side when focusing from an infinity side to a proximity side, and a third sub-lens unit having a positive refractive power. In case, at least one of the following conditional expressions are satisfied:

$$1.5 < f1/fw < 3.5; \quad \text{(8)}$$

$$-1.5 < f11/f1 < -0.9; \quad \text{(9)}$$

and $$-1.5 < f13/f11 < -0.9, \quad \text{(10)}$$

where f1 represents the focal length of the first lens unit, fw represents the focal length at the wide angle end, f11 represents a focal length of the first sub-lens unit, and f13 represents a focal length of the third sub-lens unit, The conditional expression (8) defines a ratio of the focal length of the first lens unit to the focal length at the wide angle end. By satisfying the conditional expression (8), both of the high optical performance and the reduction of the size and the weight are achieved. By satisfying the conditional expression (8), a height of the off-axial ray which passes through the first lens unit at the wide angle end can be defined, and the various aberrations can be satisfactorily corrected while the increase in size of the lens is suppressed.

If the condition of an upper limit of the conditional expression (8) is not satisfied, the refractive power of the first lens unit is decreased, and the height of the off-axial ray which passes through the first lens unit is increased, to thereby increase the size of the lens. On the other hand, if the condition of a lower limit of the conditional expression (8) is not satisfied, the refractive power of the first lens unit is increased, and in particular, the correction of the chromatic aberration at the telephoto end side, and the correction of the various aberrations become difficult to carry out.

The conditional expression (9) defines a ratio of the focal length of the first sub-lens unit to the focal length of the first lens unit. If the condition of an upper limit of the conditional expression (9) is not satisfied, the focal length of the first sub-lens unit becomes relatively short. As a result, the suppression of the variation of the various off-axial aberrations following the zoom on the wide angle side, in particular, the suppression of the distortion and the field curvature become difficult to carry out. On the other hand, if the condition of a lower limit of the conditional, expression (9) is not satisfied, the focal length of the first sub-lens unit becomes relatively long. As a result, the lens diameter of the first lens unit is increased, and hence the increased wide angle becomes difficult to attain.

The conditional expression (10) defines a ratio of the focal length of the third sub-lens unit to the focal length of the first sub-lens unit.

If the condition of an upper limit of the conditional expression (10) is not satisfied, the focal length of the first sub-lens unit becomes relatively long, and hence it becomes difficult to bring the principal point of the first lens unit closer to the image side a result, the lens diameter of the first unit is increased, and hence the size and weight of the zoom lens become difficult to reduce. On the other hand, if the condition of a lower limit of the conditional expression (10) is not satisfied, the focal length of the first sub-lens unit becomes relatively short. As a result, in particular, it becomes difficult to correct the distortion at the wide angle and the field curvature. It is further preferred to set the conditional expressions (8), (9), and (10) as follows.

$$2.0 < f1/fw < 2.7 \quad (8a)$$

$$-1.30 < f11/f1 < -1.10 \quad (9a)$$

$$-1.35 < f13/f11 < -1.10 \quad (10a)$$

Further, an image pickup apparatus of the present invention has a feature in including the zoom lens of each of the embodiments and a solid-state image pick-up element having a predetermined effective image pick-up range for receiving an image formed by the zoom lens.

A specific configuration of the zoom lens of the present invention is described below by way of features of lens configurations of Numerical Embodiments to 5 corresponding to Embodiments 1 to 5, respectively.

Embodiment 1

Figure 2A:
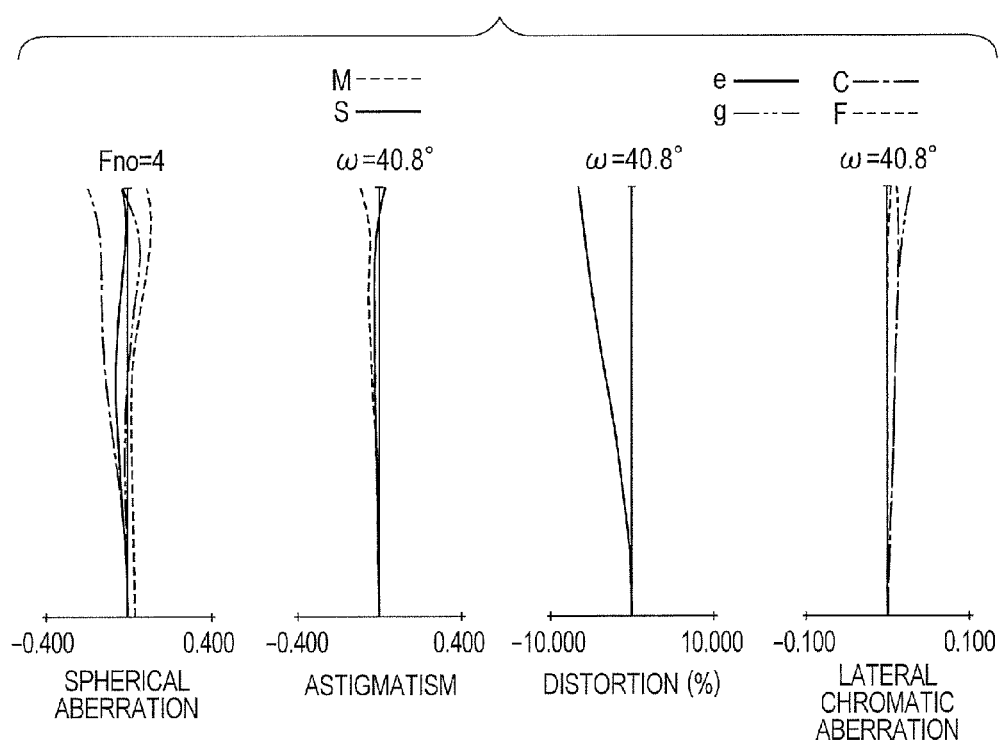
FIG. 2A is an aberration diagram in the state in which focus is at infinity at the wide angle end according to Numerical Embodiment 1.
Figure 2B:
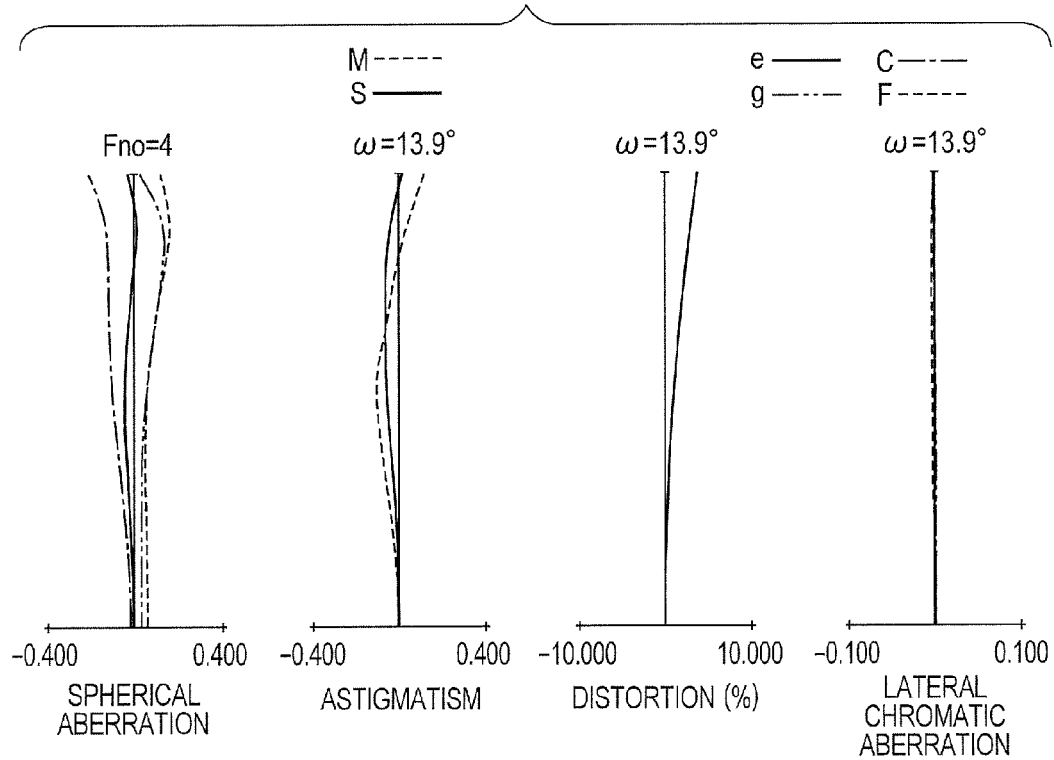
FIG. 2B is an aberration diagram in the state in which focus is at infinity at an intermediate zoom position according to Numerical Embodiment 1.
Figure 2C:
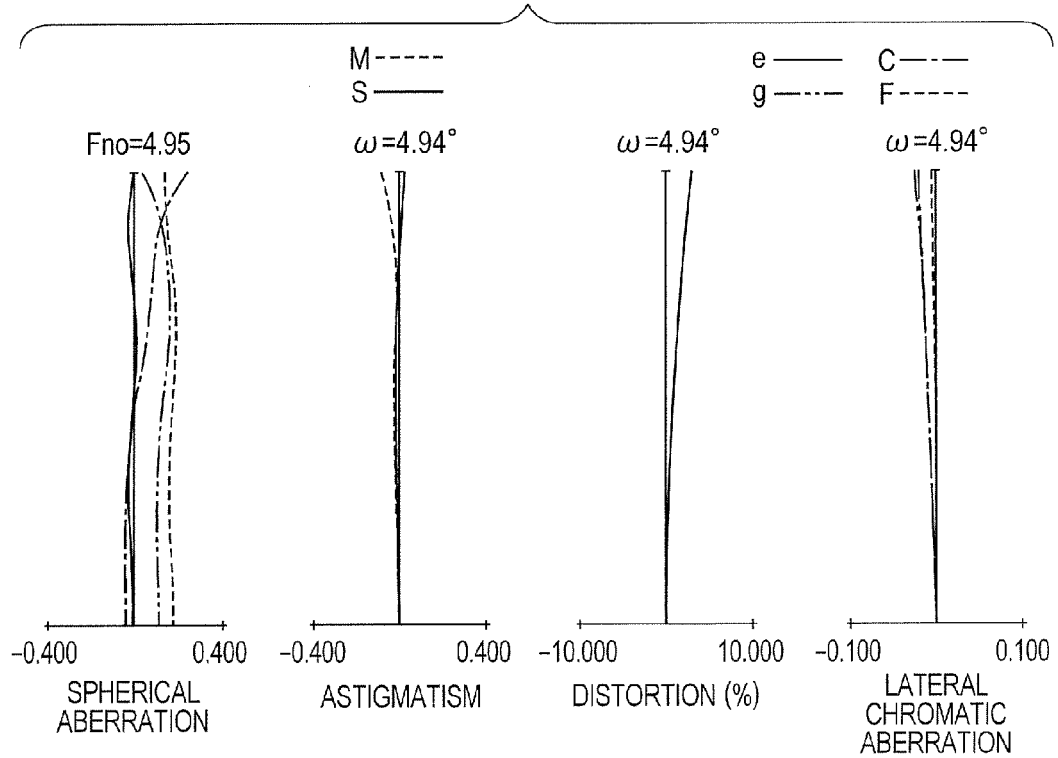
FIG. 2C is an aberration diagram in the state in which focus is at infinity at a telephoto end according to Numerical Embodiment 1.

FIG. 1 is a lens cross-sectional view when the focus is at the infinity at the wide angle end in the zoom lens according to Embodiment 1 (Numerical Embodiment 1) of the present invention, FIG. 2A is a longitudinal aberration diagram at the wide angle end of Numerical Embodiment 1. FIG. 2B is a longitudinal aberration diagram at a focal length of 65 mm of Numerical Embodiment 1. FIG. 2C is a longitudinal aberration diagram at the telephoto end of Numerical Embodiment 1. Each of the aberration diagrams is the longitudinal aberration diagram when the focus is at the infinity. In addition, the value of the focal length is a value when corresponding value in Numerical Embodiment 1 which is described later is represented in units of mm. This also applies to Numerical Embodiments which are described below.

In FIG. 1, the zoom lens includes, in order from the object side, a first lens unit U1 having a positive refractive power for focusing. The zoom lens further includes a second lens unit U2 having a negative refractive power for zooming which moves to the image side during zooming from the wide angle end to the telephoto end. The zoom lens further includes a third lens unit U3 having a negative refractive power which moves on the optical axis non linearly in conjunction with the movement of the second lens unit U2 and corrects an image plane variation accompanying the zooming. The zoom lens further includes a fourth lens unit U4 having a positive refractive power and an imaging function which does not move for zooming.

The second lens unit U2 and the third lens unit U3 construct a magnification-varying system. An aperture stop SP is disposed on the object side of the fourth lens unit U4. When used as an image pickup optical system for a broadcasting television camera, a video camera, or a digital still camera, an image plane I corresponds to an image pickup surface of a solid-state image pick-up element (photoelectric transducer) or the like for receiving an image formed by the zoom lens and converting light to electricity. When used as an image pickup optical system for a film camera, the image plane I corresponds to a film surface on which the image formed by the zoom lens is exposed.

In each of the longitudinal aberration diagrams, spherical aberrations are illustrated with respect to e-line, g-line, C-line, and F-line by a solid line, a two-dot chain line, a one-dot chain line, and a broken line, respectively. Further, astigmatisms are illustrated on a meridional image plane by a broken line and on a sagittal image plane by a solid line. In addition, lateral chromatic aberrations are illustrated with respect to g-line, C-line, and F-line by a two-dot chain line, a one-dot chain line, and a broken line, respectively. A half angle of field is denoted by ω and an F-number is denoted by Fno. In each of the longitudinal aberration diagrams, a spherical aberration is illustrated in the unit of 0.4 mm, an astigmatism in the unit of 0.4 mm, a distortion in the unit of 10%, and a lateral chromatic aberration in the unit of 0.1 mm. Note that, in each embodiment described below, each of the wide angle end and the telephoto end refers to a zooming position obtained when the second lens unit U2 for zooming is positioned at each of the ends of a range in which the second lens unit U2 may mechanically move along the optical axis.

Next, the first lens unit U1 of this embodiment is described. The first lens unit U1 corresponds to surfaces from a first surface to a twenty-first surface. The first lens unit U1 includes a first sub-lens unit U11 having a negative refractive power which does not move for focusing, a second sub-lens unit U12 having a positive refractive power which moves to the image side during focusing from the infinity side to the proximity side, and a third sub-lens unit U13 having a positive refractive power which does not move for focusing. The second lens unit U2 corresponds to surfaces from a twenty-second surface to a thirty-first surface, and the third lens unit U3 corresponds to surfaces from a thirty-second surface to thirty-fourth surface. The fourth lens unit U4 corresponds to surfaces from a thirty-sixth surface to a fifty-third surface. The fourth lens unit U4 includes a first sub-lens unit U41, and a second sub-lens unit U42 which is movable in the optical axis direction for the macro photography or the flange back adjustment. The first sub-lens unit U41 of the fourth lens unit includes, in order from the object side, a biconvex lens, a cemented lens of a biconvex lens and a biconcave lens, and a cemented lens of a biconvex lens and a biconcave lens, in addition, the second sub-lens unit U42 of the fourth lens unit includes, in order from the object side, a biconvex lens, a cemented lens of a biconvex lens and a biconcave lens, a cemented lens of a biconvex lens and a biconcave lens, and a biconvex lens.

Numerical Embodiment 1 which corresponds to the above-mentioned Embodiment 1 is described. Not only in Numerical Embodiment 1 but in all numerical embodiments, "i" denotes an order of a surface (optical surface) from the object side, "ri" denotes a curvature radius of an i-th surface from the object side, and "di" denotes an interval (on the optical axis) between the i-th surface and the (i+1)th surface from the object side. Further, "ndi", "vdi", and "θgFi" respectively denote a refractive index, an Abbe number, and a partial dispersion ratio of a medium (optical member) between the i-th surface and the (i+1)th surface, and "BF" denotes back focus corresponding to an air conversion length. The aspherical shape is expressed in the following expression:

$$X = \frac{H^2/R}{1 + \sqrt{1 - (1+k)(H/R)^2}} + A4H^4 + A6H^6 + A8H^8 + A10H^{10} + A12H^{12} + A14H^{14} + A16H^{16}$$

where an X axis corresponds to the optical axis, an H axis corresponds to an axis perpendicular to the optical axis, a traveling direction of light corresponds to a positive direction, R denotes a paraxial curvature radius, k denotes a conic constant, and A4, A6, A8, A10, A12, A14, and A16 each denote an aspherical coefficient. Further, "e−Z," denotes "×10$^{-Z}$".

Table 1 shows values corresponding to the conditional expressions of Embodiment 1, Embodiment 1 satisfies the conditional expressions (1) to (10), and achieves all of the photographing angle of field (angle of field) of 81.6 at the wide angle end, the zoom ratio of 10, the increased wide angle, and the high magnification. Moreover, Embodiment 1 achieves the zoom lens having the high optical performance in which the various aberrations are satisfactorily corrected in the entire zoom range. Further, Embodiment 1 achieves the zoom lens with which the macro photography or the flange back adjustment can be carried out.

However, it is essential that the zoom lens of the present invention satisfy Expressions (1) and (2), but the zoom lens does not always need to satisfy Expressions (3) to (10). However, when at least one of Expressions (3) to (10) is satisfied, even better effects may be provided. This is also true for the other embodiments.

Figure 12:
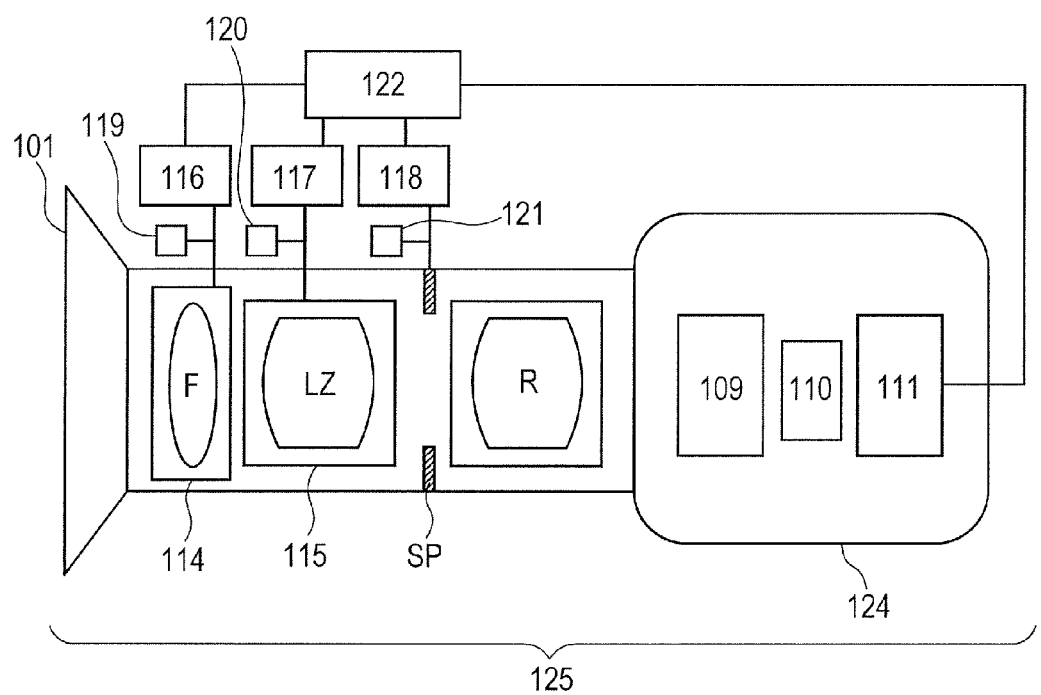
FIG. 12 is a schematic diagram illustrating a main part of an image pickup apparatus according to the present invention.

FIG. 12 is a schematic diagram illustrating an image pickup apparatus (television camera system) having the zoom lens according to each embodiment as an image pickup optical system. Referring to FIG. 12, an image pickup apparatus 125 includes a zoom lens 101, which is any one of the zoom lenses according to Embodiments 1 to 5. The zoom lens 101 may be detachably mounted on a camera body 124, to thereby construct the image pickup apparatus 125. The zoom lens 101 includes a first lens unit F, a magnification varying unit LZ, and a fourth lens unit R for imaging. The first lens unit F includes a lens unit for focusing. The magnification varying unit LZ includes second lens unit which moves along the optical, axis for zooming. In addition, the magnification varying unit LZ includes a third lens unit which moves along the optical axis to correct an image plane variation due to zooming. Further, the zoom lens 101 includes an aperture stop SP. In addition, the zoom lens 101 includes driving mechanisms 114 and 115, such as a helicoid or a cam, which drive the first lens unit F and the magnification varying unit LZ, respectively, along the optical axis. The image pickup apparatus 125 includes motors (driving units) 116 to 118, which electrically drive the driving mechanisms 114 and 115 and the aperture stop SP, respectively. Detectors 119 to 121, such as an encoder, a potentiometer, or a photo-sensor, are configured to detect the position of the first lens unit F, the position of the magnification varying unit LZ on the optical axis, and the aperture diameter of the aperture stop SP, respectively. In addition, the camera body 124 includes a glass block 109, which is equivalent to an optical filter or a color separation optical system provided within the camera body 124. Further, the camera body 124 includes a solid state image pickup element (photoelectrical transducer) 110, such as a charge-coupled device (CCD) sensor or a complementary metal-oxide semiconductor (CMOS) sensor. The solid-state image pickup element 110 is configured to receive an object image formed by the zoom lens 101. Further, central processing units (CPUs) 111 and 122 control the driving of the camera body 124 and the zoom lens 101, respectively.

By applying the zoom lens according to the present invention to a television camera as described above, an image pickup apparatus having high optical performance may be implemented.

Embodiment 2

Figure 3:
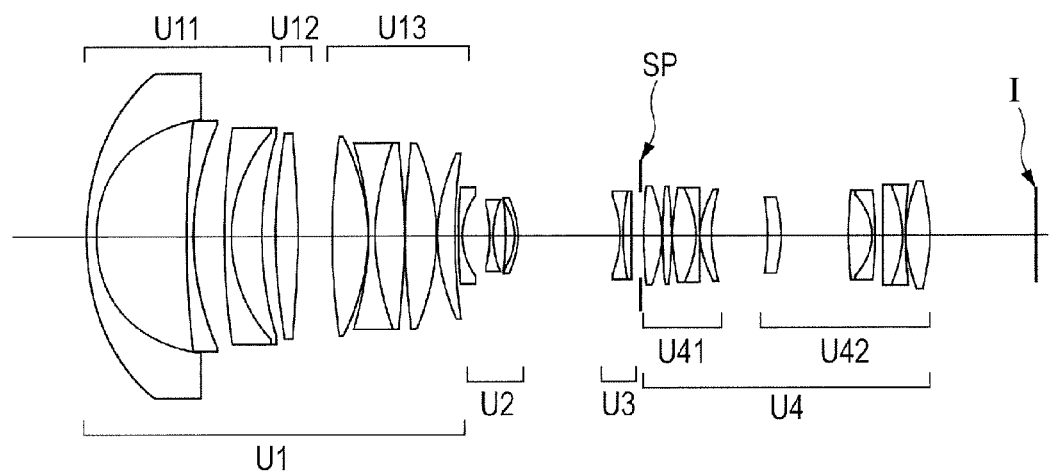
FIG. 3 is a lens cross-sectional view in the state in which focus is at infinity at a wide angle end according to Numerical Embodiment 2.
Figure 4A:
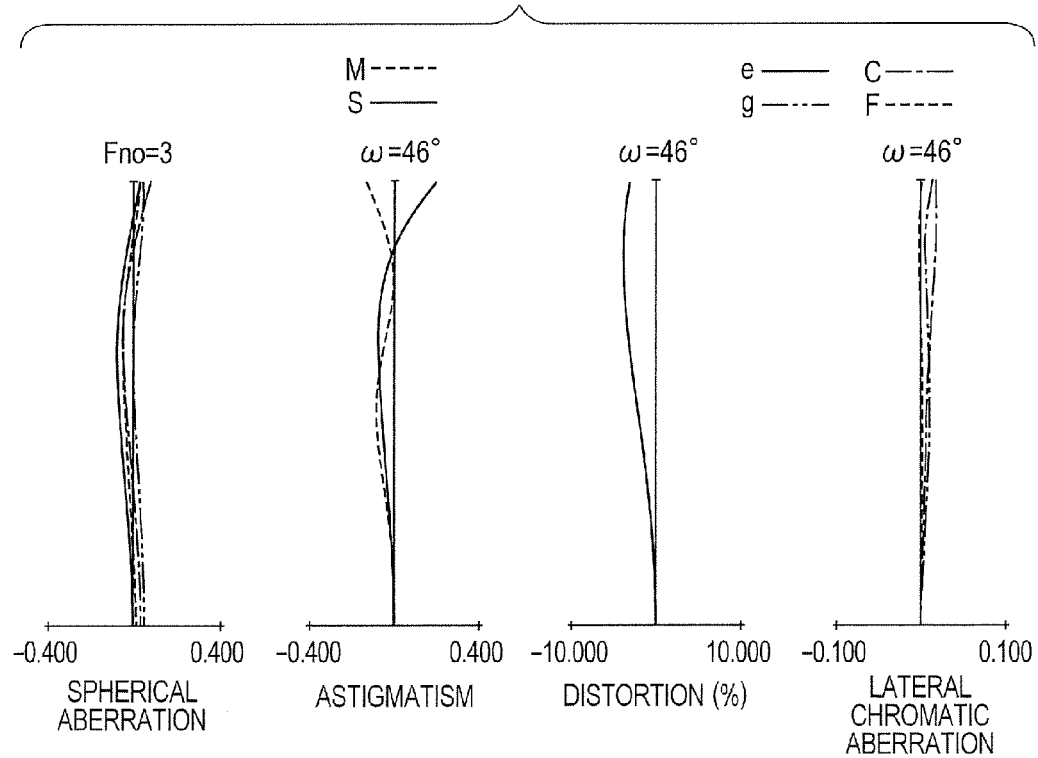
FIG. 4A is an aberration diagram in the state in which focus is at infinity at the wide angle end according to Numerical Embodiment 2.
Figure 4B:
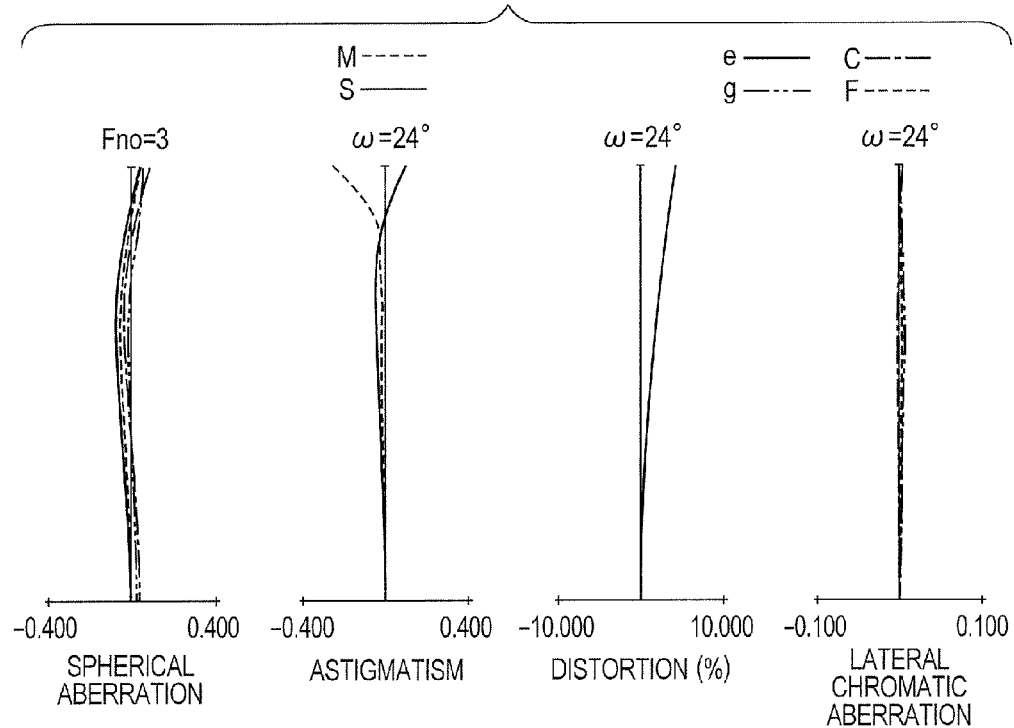
FIG. 4B is an aberration diagram in the state in which focus is at infinity at an intermediate zoom position according to Numerical Embodiment 2.
Figure 4C:
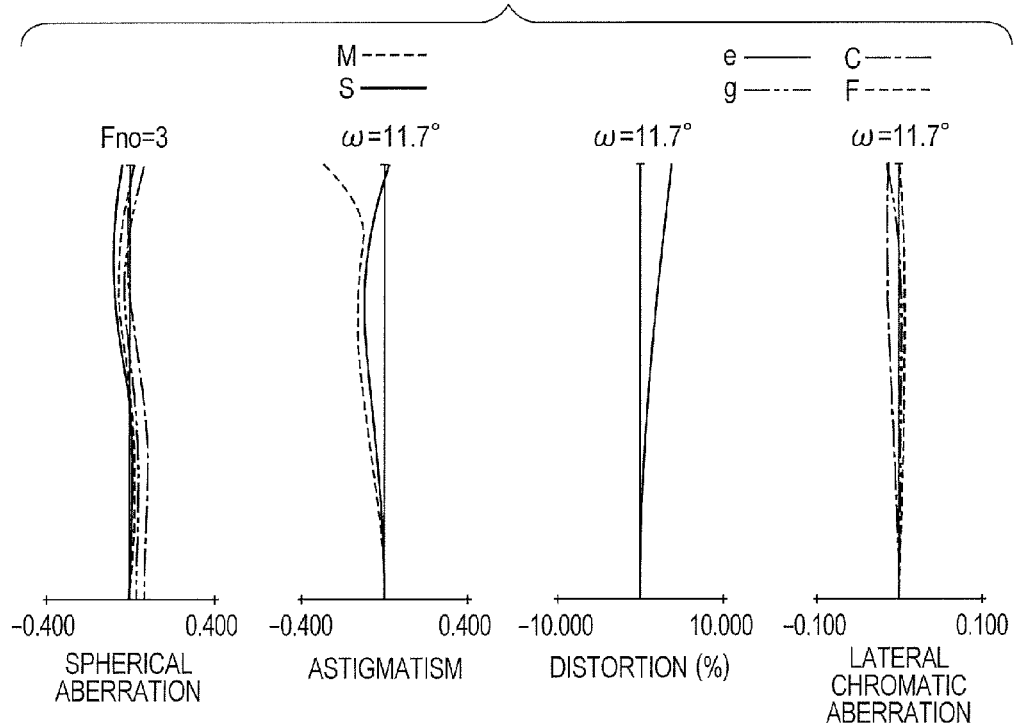
FIG. 4C is an aberration diagram in the state in which focus is at infinity at a telephoto end according to Numerical Embodiment 2.

FIG. 3 is a lens cross-sectional view when the focus is at the infinity at the wide angle end in the zoom lens according to Embodiment 2 (Numerical Embodiment 2) of the present invention. FIG. 4A is a longitudinal aberration diagram at the wide angle end of Numerical Embodiment 2, FIG. 4B is a longitudinal aberration diagram at a focal length of 35 mm of Numerical Embodiment 2. FIG. 4C is a longitudinal aberration diagram at the telephoto end of Numerical Embodiment 2. Each of the aberration diagrams is a longitudinal aberration diagram when the focus is at the infinity. In FIG. 3, the zoom lens includes, in order from the object side, a first lens unit U1 having a positive refractive power for focusing. The zoom lens further includes a second lens unit U2 having a negative refractive power for varying magnification which moves to the image side for zooming from the wide angle end to the telephoto end. The zoom lens further includes a third lens unit U3 having a negative refractive power which moves on the optical axis nonlinearly in conjunction with the movement of the second lens unit U2 and corrects an image plane variation accompanying the zooming. The zoom lens further includes a fourth lens unit U4 having a positive refractive power and an imaging function which does not move for zooming.

Next, the first lens unit U1 of this embodiment is described. The first lens unit U1 corresponds to surfaces from a first surface to an eighteenth surface. The first lens unit U1 includes a first sub-lens unit U11 having a negative refractive power which does not move for focusing, a second sub-lens unit U12 having a positive refractive power which moves to the image side during focusing from the infinity side to the proximity side, and a third sub-lens unit U13 having a positive refractive power which does not move for focusing. The second lens unit U2 corresponds to surfaces from a nineteenth surface to a twenty-fifth surface, and the third lens unit U3 corresponds to surfaces from a twenty-sixth surface to a twenty-eighth surface. The fourth lens unit U4 corresponds to surfaces from a thirtieth surface to a forty-eighth surface. The fourth lens unit U4 includes a first sub-lens unit U41, and a second sub-lens unit U42 which is movable in the optical axis direction for the macro photography or the flange back adjustment. The first sub-lens unit U41 of the fourth lens unit include, in order from the object side, a biconvex lens, a biconvex lens, a cemented lens of a biconvex lens and a biconcave lens, and a meniscus convex lens which is concave to the image side. In addition, the second sub-lens unit U42 of the fourth lens includes, in order from the object side, a meniscus convex lens which is concave to the object side, a cemented lens of a biconvex lens and a meniscus concave lens which is convex to the image side, a cemented lens of a biconvex lens and a biconcave lens, and a biconvex lens.

Table 1 shows values corresponding to the conditional expressions of Embodiment 2. Embodiment 2 satisfies the conditional expressions (1) to (10), and achieves all of the photographing angle of field (angle of field) of 92.0° at the wide angle end, the zoom ratio of 5, the increased wide angle, and the high magnification. Moreover, Embodiment 2 achieves the zoom lens having the high optical performance in which the various aberrations are satisfactorily corrected in the entire zoom range. Further, Embodiment 2 achieves the zoom lens with which the macro photography or the flange back adjustment can be carried out.

Embodiment 3

Figure 5:
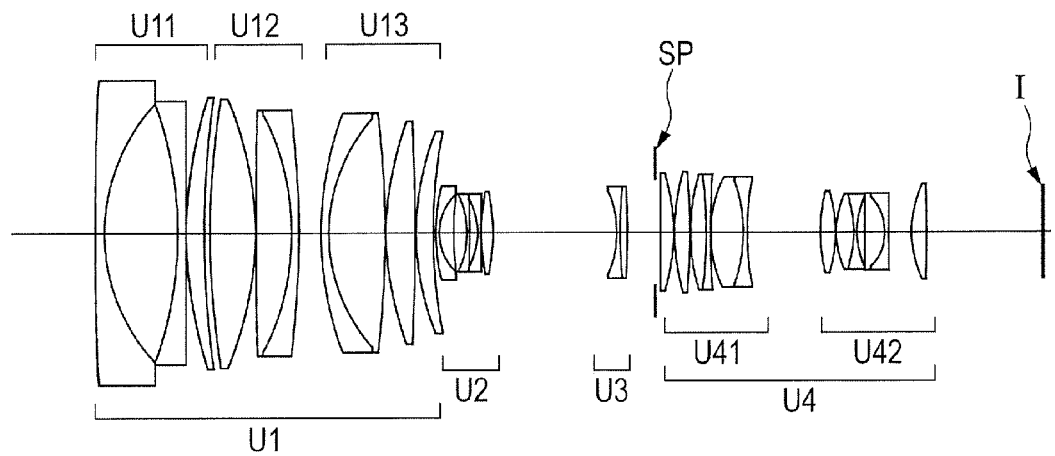
FIG. 5 is a lens cross-sectional view in the state in which focus is at infinity at a wide angle end according to Numerical Embodiment 3.
Figure 6A:
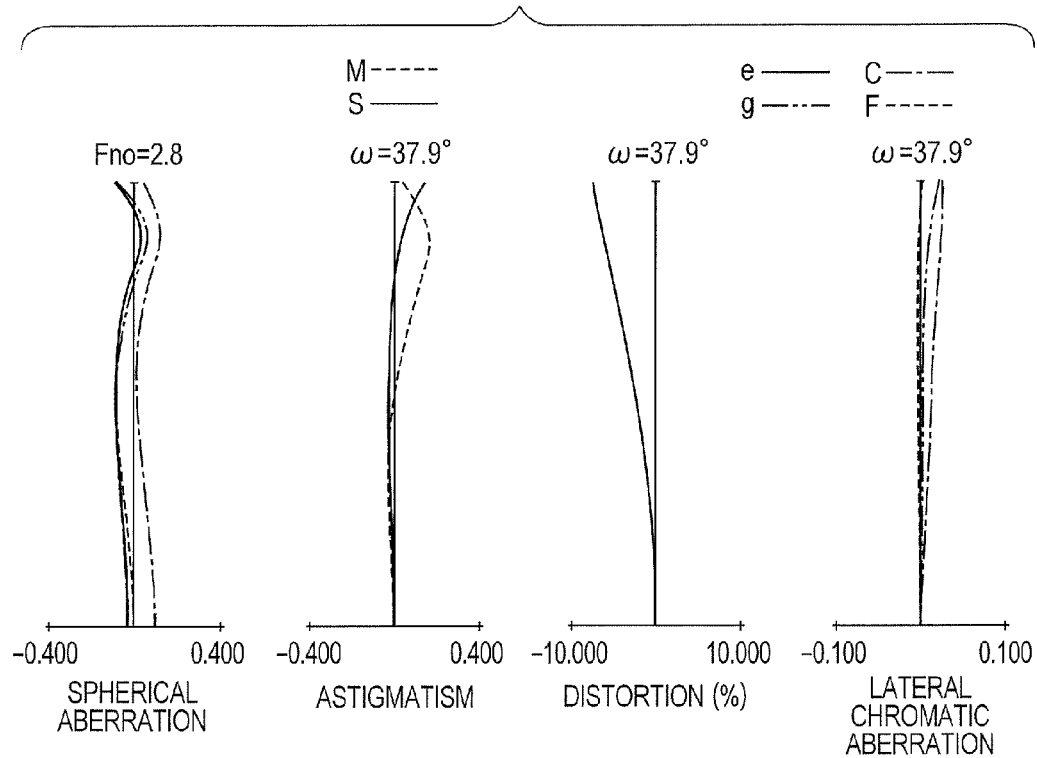
FIG. 6A is an aberration diagram in the state in which focus is at infinity at the wide angle end according to Numerical Embodiment 3.
Figure 6B:
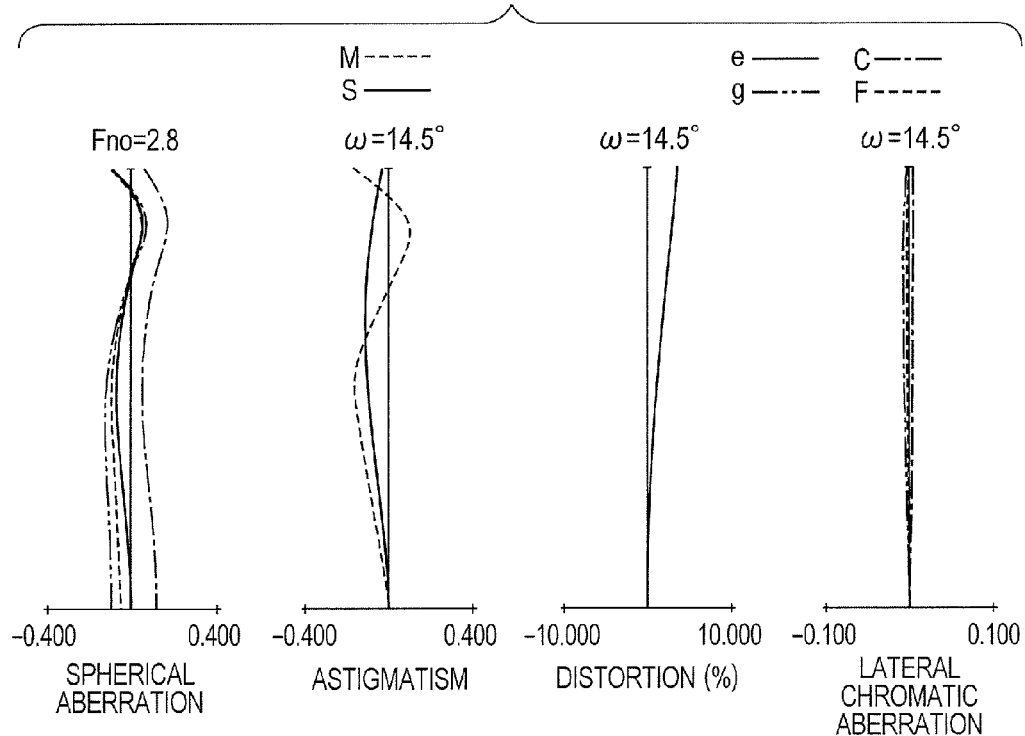
FIG. 6B is an aberration diagram in the state in which focus is at infinity at an intermediate zoom position according to Numerical Embodiment 3.
Figure 6C:
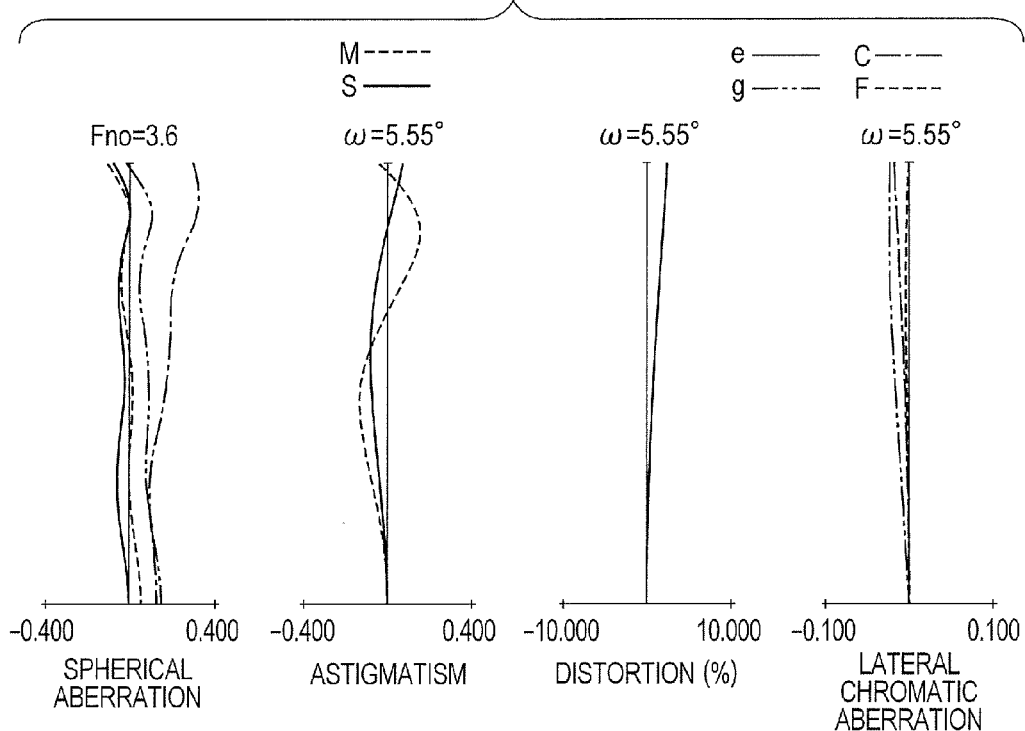
FIG. 6C is an aberration diagram in the state in which focus is at infinity at a telephoto end according to Numerical Embodiment 3.

FIG. 5 is a lens cross-sectional view when the focus is at the infinity at the wide angle end in the zoom lens according to Embodiment 3 (Numerical Embodiment 3) of the present invention. FIG. 6A is a longitudinal aberration diagram at the wide angle end of Numerical Embodiment 3. FIG. 6B is a longitudinal aberration diagram at a focal length of 60 mm of Numerical Embodiment 3. FIG. 6C is a longitudinal aberration diagram at the telephoto end of Numerical Embodiment 3. Each of the aberration diagrams is a longitudinal aberration diagram when the focus is at the infinity.

In FIG. 5, the zoom lens includes, in order from the object side, a first lens unit U1 having a positive refractive power for focusing. The zoom lens further includes a second lens unit U2 having a negative refractive power for varying magnification which moves to the image side for zooming from the wide angle end to the telephoto end. The zoom lens further includes a third lens unit U3 having a negative refractive power which moves on the optical axis nonlinearly in conjunction with the movement of the second lens unit U2 and corrects an image plane variation accompanying the zooming. The zoom lens further includes a fourth lens unit U4 having a positive refractive power and an imaging function which does not move for zooming.

Next, the first lens unit U1 of this embodiment is described. The first lens unit U1 corresponds to surfaces from a first surface to an eighteenth surface. The first lens unit U1 includes a first sub-lens unit U11 having a negative refractive power which does not move during focusing, a second sub-lens unit U12 having a positive refractive power which moves to the image side during focusing from the infinity side to the proximity side, and a third sub-lens unit U13 having a positive refractive power which does not move during focusing. The second lens unit U2 corresponds to surfaces from a nineteenth surface to a twenty-seventh surface, and the third lens unit U3 corresponds to surfaces from a twenty-eighth surface to a thirtieth surface. The fourth lens unit U4 corresponds to surfaces from a thirty-second surface to a fifty-first surface. The fourth lens unit U4 includes a first sub-lens unit U41, and a second sub-lens unit U42 which is movable in the optical axis direction for the macro photography or the flange back adjustment. The first sub-lens unit U41 of the fourth lens unit includes, in order from the object side, a biconvex lens, a biconvex lens, a cemented lens of a biconvex lens and a biconcave lens, and a cemented lens of a biconvex lens and a biconcave lens. In addition, the second sub-lens unit U42 of the fourth lens unit includes, in order from the object side, a biconvex lens, a cemented lens of a biconvex lens and a biconcave lens, cemented lens of a biconvex lens and a biconcave lens, and a biconvex lens.

Table 1 shows values corresponding to the conditional expressions of Embodiment 3. Embodiment satisfies the conditional expressions (1) to (10), and achieves all of the photographing angle of field (angle of field) of 75.8° at the wide angle end, the zoom ratio of 8, the increased wide angle, and the high magnification. Moreover, Embodiment 3 achieves the zoom lens having the high optical performance in which the various aberrations are satisfactorily corrected in the entire zoom range. Further, Embodiment 3 achieves the zoom lens with which the macro photography or the flange back adjustment can be carried out.

Embodiment 4

FIG. 7 is a lens cross-sectional view when the focus is at the infinity at the wide angle end in the zoom lens according to Embodiment 4 (Numerical Embodiment 4) of the present invention. FIG. 8A is a longitudinal aberration diagram at the wide angle end of Numerical Embodiment 4. FIG. 8B is a longitudinal aberration diagram at a focal length of 45 mm of Numerical Embodiment 4 FIG. 8C is a longitudinal aberration diagram at the telephoto end of Numerical Embodiment 4. Each of the aberration diagrams is a longitudinal aberration diagram when the focus is at the infinity.

In FIG. 7, the zoom lens includes, in order from the object side, a first lens unit U1 having a positive refractive power for focusing. The zoom lens further includes a second lens unit U2 having a negative refractive power for varying magnification which moves to the image side for zooming from the wide angle end to the telephoto end. The zoom lens further includes a third lens unit U3 having a negative refractive power which moves on the optical axis nonlinearly in conjunction with the movement of the second lens unit U2 and corrects an image plane variation accompanying the zooming. The zoom lens further includes a fourth lens unit U4 having a positive refractive power and an imaging function which does not move for zooming.

Next, the first lens unit U1 of this embodiment is described. The first lens unit U1 corresponds to surfaces from a first surface to a fifteenth surface. The first lens unit U1 includes a first sub-lens unit U11 having a negative refractive power which does not move during focusing, a second sub-lens unit U12 having a positive refractive power which moves to the image side during focusing from the infinity side to the proximity side, and a third sub-lens unit U13 having a positive refractive power which does not move during focusing. The second lens unit U2 corresponds to surfaces from a sixteenth surface to a twenty-third surface, and the third lens unit U3 corresponds to surfaces from a twenty-forth surface to a twenty-sixth surface. The fourth lens unit U4 corresponds to surfaces from a twenty-eighth surface to a forty-fifth surface. The fourth lens unit U4 includes a first sub-lens unit U41, and a second sub-lens unit U42 which is movable in the optical axis direction for the macro photography or the flange back adjustment. The first sub-lens unit U41 of the fourth lens unit includes, in order from the object side, a meniscus convex lens which is concave to the image side, a biconvex lens, a cemented lens of a biconvex lens and a meniscus concave lens which is convex to the image side, and a meniscus convex lens which is concave to the image side. In addition, the second sub lens unit U42 of the fourth lens unit includes, in order from the object side, a cemented lens of a meniscus concave lens which is convex to the object side and a biconvex lens, a cemented lens of a biconvex lens and a biconvex lens, and a cemented lens of a biconvex lens and a meniscus concave lens which is convex to the image side.

Table 1 shows values corresponding to the conditional expressions of Embodiment 4 Embodiment satisfies the conditional expressions (1) to (10), and achieves all of the photographing angle of field (angle of field) of 78.6° at the wide angle end, the zoom ratio of 5, the increased, wide angle, and the high magnification. Moreover, Embodiment 4 achieves the zoom lens having the high optical performance in which the various aberrations are satisfactorily corrected in the entire zoom range. Further, Embodiment 4 achieves the zoom lens with which the macro photography or the flange back adjustment can be carried out.

Embodiment 5

Figure 9:
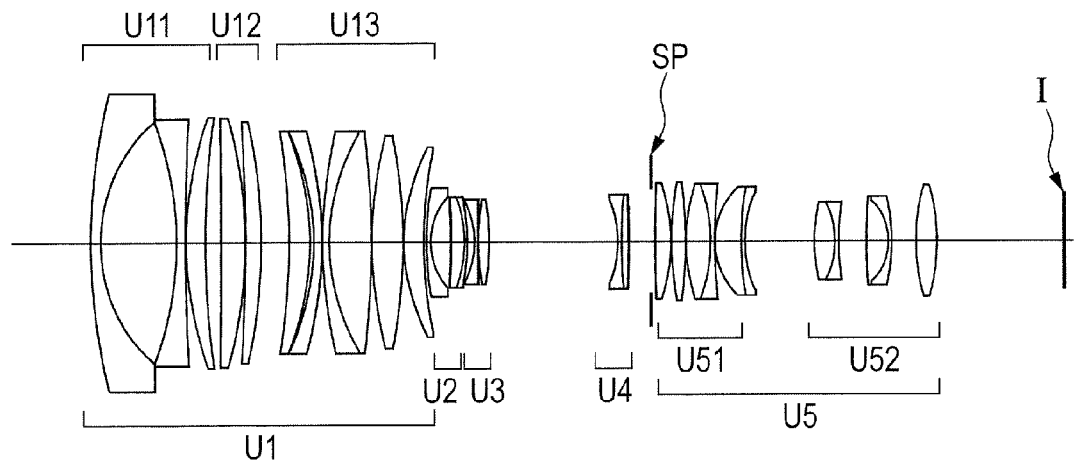
FIG. 9 is a lens cross-sectional view in the state in which focus is at infinity at a wide angle end according to Numerical Embodiment 5.
Figure 10A:
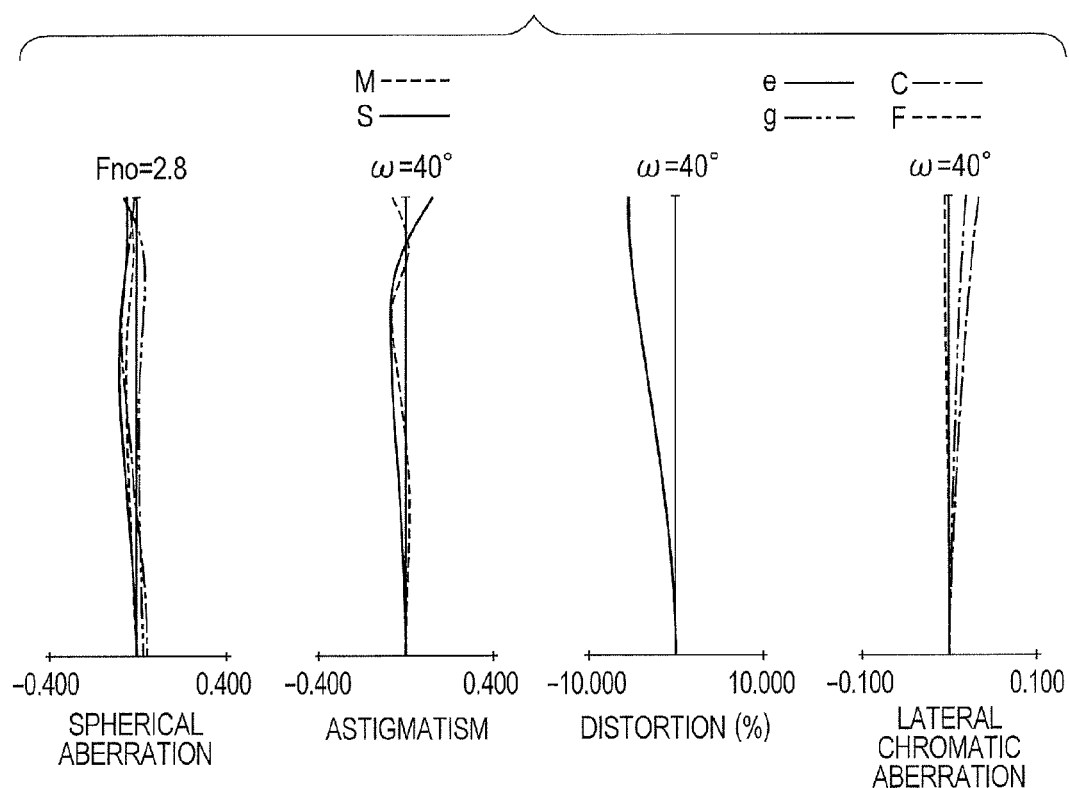
FIG. 10A is an aberration diagram in the state in which focus is at infinity at the wide angle end according to Numerical Embodiment 5.
Figure 10B:
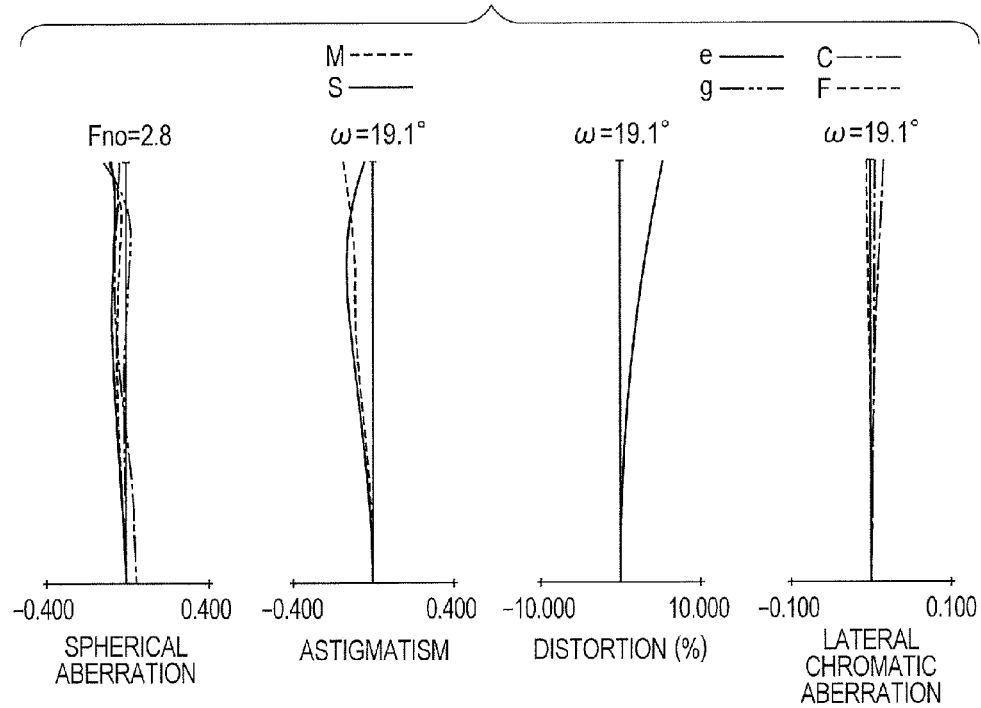
FIG. 10B is an aberration diagram in the state in which focus is at infinity at an intermediate zoom position according to Numerical Embodiment 5.
Figure 10C:
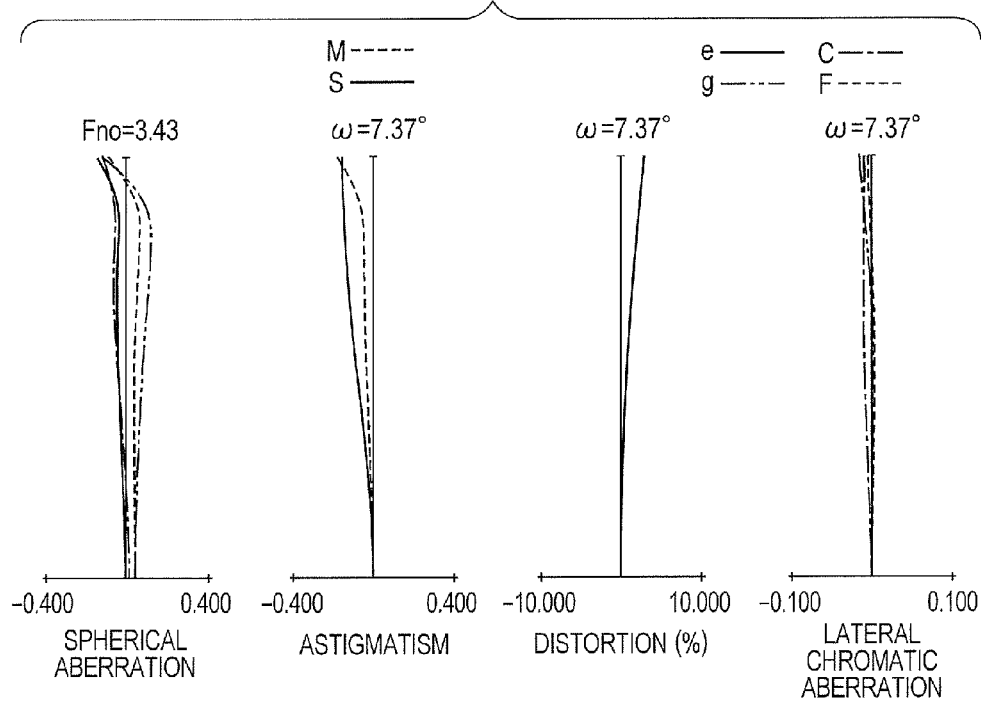
FIG. 10C is an aberration diagram in the state in which focus is at infinity at a telephoto end according to Numerical Embodiment 5.

FIG. 9 is a lens cross-sectional view when the focus is at the infinity at the wide angle end in the zoom lens according to Embodiment 5 (Numerical Embodiment 5) of the present invention. FIG. 10A is a longitudinal aberration diagram at the wide angle end of Numerical Embodiment 5. FIG. 10B is a longitudinal, aberration diagram at a focal length of 45 mm of Numerical Embodiment 5. FIG. 10C is a longitudinal aberration diagram at the telephoto end of Numerical Embodiment 5. Each of the aberration diagrams is a longitudinal aberration, diagram when the focus is at the infinity.

In FIG. 9, the zoom lens includes, in order from the object side, a first lens unit U1 having a positive refractive power for focusing. The zoom lens further includes a second lens unit U2 having a negative refractive power for varying magnification which moves to the image side during zooming from the wide angle end to the telephoto end. The zoom lens further includes a third lens unit U3 having a negative refractive power for varying magnification which moves to the image side during zooming from the wide angle end to the telephoto end. The zoom lens further includes a fourth lens unit U4 having a negative refractive power which moves on the optical axis nonlinearly in conjunction with the movement of the second lens unit U2 and the third lens unit U1 and corrects an image plane variation accompanying the zooming. The zoom lens further includes a fifth lens unit U5 having a positive refractive power and an imaging function which does not move for zooming.

Next, the first lens unit U1 of this embodiment is described. The first lens unit U1 corresponds to surfaces from a first surface to a twenty-first surface. The first lens unit U1 includes a first sub-lens unit U11 having a negative refractive power which does not move during focusing, a second sub-lens unit U12 having a positive refractive power which moves to the image side during focusing from the infinity side to the proximity side, and a third sub-lens unit U13 having a positive refractive power which does not move during focusing. The second lens unit U2 corresponds to surfaces from a twenty-second surface to a twenty-sixth surface, third lens unit U3 corresponds to surfaces from a twenty-seventh surface to a thirtieth surface, and the fourth lens unit U4 corresponds to surfaces from a thirty-first surface to a thirty-third surface. The fifth lens unit U5 corresponds to surfaces from a thirty-fifth surface to a fifty-second surface. The fifth lens unit U5 includes a first sub-lens unit U51, and a second sub-lens unit U52 which is movable in the optical axis direction for the macro photography or the flange back adjustment. The first sub-lens unit U51 of the fifth lens unit includes, in order from the object side, plano-convex lens, a biconvex lens, a cemented lens of the biconvex lens and a biconcave lens, and a cemented lens of a meniscus convex lens which is concave to the image side and a meniscus concave lens which is convex to the object side. In addition, the second sub lens unit U52 of the fifth lens unit includes, in order from the object side, a cemented lens of a biconvex lens and a biconcave lens, a cemented lens of a biconvex lens and a meniscus concave lens which is convex to the image side, and a biconvex lens.

Table 1 shows values corresponding to the conditional expressions of Embodiment 5 satisfies the conditional expressions (1) to (10), and achieves all of the photographing angle of field (angle of field) of 80.1° at the wide angle end, the zoom ratio of 6.5, the increased wide angle, and the high magnification. Moreover, Embodiment 5 achieves the zoom lens having the high optical performance in which the various aberrations are satisfactorily corrected in the entire zoom range. Further, Embodiment 5 achieves the zoom lens with which the macro photography or the flange back adjustment can be carried out.

The exemplary embodiments of the present invention have been described above. However, the present invention is not limited to those exemplary embodiments, and various modifications and changes can be made thereto within the gist of the present invention.

<Numerical Embodiment 1>
Unit: mm

Surface data

| Surface number | r | d | nd | vd | θgF | Effective diameter | Focal length |
|---|---|---|---|---|---|---|---|
| 1* | 107.07477 | 3.50000 | 1.772499 | 49.60 | 0.5521 | 94.999 | −94.002 |
| 2 | 42.77453 | 29.44657 | | | | 74.747 | |
| 3 | −111.18408 | 2.00000 | 1.772499 | 49.60 | 0.5521 | 74.020 | −86.187 |
| 4 | 169.27879 | 0.19853 | | | | 73.831 | |
| 5 | 111.15261 | 6.53424 | 1.959060 | 17.47 | 0.6599 | 74.684 | 162.844 |
| 6 | 362.57244 | 4.83576 | | | | 74.310 | |
| 7* | 402.11683 | 9.52789 | 1.620411 | 60.29 | 0.5426 | 73.646 | 143.795 |
| 8 | −114.18218 | 7.22051 | | | | 73.330 | |
| 9 | 273.53589 | 11.14023 | 1.496999 | 81.54 | 0.5374 | 67.740 | 131.565 |
| 10 | −85.09102 | 1.32713 | | | | 67.551 | |
| 11 | −74.32274 | 2.00000 | 1.805181 | 25.42 | 0.6161 | 67.398 | −164.470 |
| 12 | −169.44313 | 1.00002 | | | | 68.351 | |
| 13 | 2516.57481 | 1.80000 | 1.850259 | 32.27 | 0.5929 | 68.012 | −98.133 |
| 14 | 81.30733 | 11.18444 | 1.438750 | 94.93 | 0.5343 | 67.555 | 149.790 |
| 15 | −332.76941 | 0.20010 | | | | 67.981 | |
| 16 | 7491.62170 | 5.08975 | 1.496999 | 81.54 | 0.5374 | 68.578 | 390.027 |
| 17 | −199.54524 | 0.20000 | | | | 69.118 | |
| 18 | 1595.58460 | 5.39098 | 1.595220 | 67.74 | 0.5442 | 69.947 | 305.715 |
| 19 | −205.94799 | 0.20000 | | | | 70.201 | |
| 20 | 216.17076 | 10.28079 | 1.730000 | 49.00 | 0.5575 | 70.182 | 104.355 |
| 21 | −116.13168 | (Variable) | | | | 69.897 | |
| 22* | 50.60782 | 1.00000 | 1.882997 | 40.76 | 0.5667 | 31.807 | −41.311 |
| 23 | 21.07209 | 6.61768 | | | | 27.724 | |
| 24 | −79.54129 | 1.00000 | 1.754998 | 52.32 | 0.5476 | 27.582 | −47.508 |
| 25 | 66.22881 | 0.99806 | | | | 26.863 | |
| 26 | 48.90892 | 4.02300 | 1.882210 | 23.78 | 0.6036 | 26.802 | 40.333 |
| 27 | −130.21404 | 1.94929 | | | | 26.376 | |
| 28 | −37.12529 | 1.00000 | 1.618000 | 63.33 | 0.5441 | 26.194 | −55.128 |
| 29 | 438.13751 | 0.20000 | | | | 25.725 | |
| 30 | 34.72260 | 1.88615 | 1.613397 | 44.30 | 0.5633 | 25.302 | 287.073 |
| 31 | 42.29949 | (Variable) | | | | 24.759 | |
| 32 | −46.20252 | 1.00000 | 1.696797 | 55.53 | 0.5433 | 22.167 | −45.199 |
| 33 | 101.17257 | 2.21450 | 1.808095 | 22.76 | 0.6307 | 23.128 | 112.579 |
| 34 | −994.45522 | (Variable) | | | | 23.547 | |
| 35 (Stop) | ∞ | 1.29695 | | | | 28.883 | |

<Numerical Embodiment 1>
Unit: mm

| | | | | | | | |
|---|---|---|---|---|---|---|---|
| 36 | 143.50842 | 4.48049 | 1.816000 | 46.62 | 0.5568 | 29.930 | 47.136 |
| 37 | −52.16988 | 0.20000 | | | | 30.182 | |
| 38 | 52.13637 | 6.23615 | 1.487490 | 70.23 | 0.5300 | 29.349 | 48.593 |
| 39 | −41.96851 | 1.20000 | 2.000690 | 25.46 | 0.6133 | 28.856 | −39.407 |
| 40 | 781.32347 | 0.19891 | | | | 28.725 | |
| 41 | 22.82507 | 9.56381 | 1.516330 | 64.14 | 0.5352 | 28.572 | 29.895 |
| 42 | −41.33452 | 1.00000 | 1.834000 | 37.16 | 0.6775 | 27.399 | −26.832 |
| 43 | 50.02430 | 6.99907 | | | | 25.923 | |
| 44 | 386.69864 | 3.99920 | 1.487490 | 70.23 | 0.5300 | 25.416 | 67.610 |
| 45 | −36.04126 | 1.08491 | | | | 25.291 | |
| 46 | 34.86509 | 4.96949 | 1.922860 | 20.88 | 0.6282 | 22.498 | 20.574 |
| 47 | −39.79509 | 0.90000 | 1.882997 | 40.76 | 0.5667 | 21.517 | −18.496 |
| 48 | 28.27246 | 8.88270 | | | | 18.955 | |
| 49 | 37.01797 | 4.62848 | 1.438750 | 94.93 | 0.5343 | 16.005 | 25.301 |
| 50 | −15.30482 | 1.00000 | 1.953750 | 32.32 | 0.5898 | 15.736 | −12.619 |
| 51 | 60.19086 | 2.75426 | | | | 16.455 | |
| 52 | 45.70173 | 3.00473 | 1.620411 | 60.29 | 0.5426 | 18.630 | 48.353 |
| 53 | −86.09140 | 50.07000 | | | | 18.983 | |
| Image plane | ∞ | | | | | | |

Aspherical surface data

First surface

K = 1.92497e+000    A4 = 1.92902e−009    A6 = 6.26259e−011    A8 = −9.53828e−014
A10 = 6.21216e−017    A12 = 2.17747e−020    A14 = 3.29927e−024    A16 = −2.10130e−028

Seventh surface

K = −2.29488e+001    A4 = −4.72874e−007    A6 = 4.95024e−011    A8 = 4.20753e−014
A10 = −7.75550e−017    A12 = 9.10273e−020    A14 = −5.11370e−023    A16 = 1.17437e−026

Twenty-second surface

K = 5.48442e−001    A4 = 1.59884e−007    A6 = −3.77659e−009    A8 = 1.79255e−011
A10 = −4.48568e−014    A12 = −3.70888e−016    A14 = 2.09083e−018    A16 = −2.91328e−021

Various data
Zoom ratio 10.00

| | Wide angle | Intermediate | Telephoto |
|---|---|---|---|
| Focal length | 18.00 | 63.00 | 180.00 |
| F number | 4.00 | 4.00 | 4.95 |
| Half angle of field | 40.82 | 13.86 | 4.94 |
| Image height | 15.55 | 15.55 | 15.55 |
| Total lens length | 320.10 | 320.10 | 320.10 |
| BF | 50.07 | 50.07 | 50.07 |
| d21 | 0.70 | 45.74 | 65.06 |
| d31 | 60.47 | 8.62 | 6.48 |
| d34 | 11.50 | 18.30 | 1.12 |
| Entrance pupil position | 57.50 | 105.61 | 175.05 |
| Exit pupil position | −33.80 | −33.80 | −33.80 |
| Front principal point position | 71.63 | 121.28 | −31.27 |
| Rear principal point position | 32.07 | −12.93 | −129.93 |

Zoom lens unit data

| Unit | First surface | Focal length | Lens structure length | Front principal point position | Rear principal point position |
|---|---|---|---|---|---|
| 1 | 1 | 57.00 | 113.08 | 71.51 | 43.38 |
| 2 | 22 | −26.70 | 18.67 | 3.98 | −9.70 |
| 3 | 32 | −76.10 | 3.21 | −0.16 | −1.98 |
| 4 | 36 | 31.05 | 61.10 | −12.38 | −41.97 |

<Numerical Embodiment 2>
Unit: mm

Surface data

| Surface number | r | d | nd | vd | θgF | Effective diameter | Focal length |
|---|---|---|---|---|---|---|---|
| 1* | 86.96069 | 2.80000 | 1.772499 | 49.60 | 0.5521 | 99.506 | −85.846 |
| 2 | 37.19554 | 28.65314 | | | | 72.568 | |
| 3 | 287.18991 | 2.20000 | 1.772499 | 49.60 | 0.5521 | 71.378 | −151.018 |
| 4 | 82.96532 | 9.79457 | | | | 68.012 | |
| 5 | 233.30951 | 2.20000 | 1.772499 | 49.60 | 0.5521 | 67.303 | −81.001 |
| 6 | 49.32285 | 9.90654 | 1.922860 | 18.90 | 0.6495 | 64.827 | 83.114 |
| 7 | 122.07948 | 4.11145 | | | | 64.165 | |
| 8 | 174.57379 | 7.40358 | 1.496999 | 81.54 | 0.5374 | 63.832 | 170.294 |
| 9* | −162.88781 | 10.55549 | | | | 63.329 | |
| 10 | 219.22560 | 11.10101 | 1.618000 | 63.33 | 0.5441 | 61.797 | 87.081 |
| 11 | −70.29224 | 0.51997 | | | | 61.501 | |
| 12 | −90.66362 | 2.00000 | 1.805181 | 25.42 | 0.6161 | 58.344 | −51.316 |
| 13 | 77.98219 | 9.18481 | 1.496999 | 81.54 | 0.5374 | 56.765 | 117.857 |
| 14 | −228.82556 | 0.21692 | | | | 57.161 | |
| 15 | 229.51464 | 10.00000 | 1.595220 | 67.74 | 0.5442 | 57.792 | 89.884 |
| 16 | −68.94195 | 0.20000 | | | | 57.805 | |
| 17 | 57.54531 | 5.56934 | 1.730000 | 49.00 | 0.5575 | 50.901 | 114.868 |
| 18 | 174.06610 | (Variable) | | | | 50.045 | |
| 19* | 222.99988 | 1.30000 | 1.772499 | 49.60 | 0.5521 | 29.397 | −31.652 |
| 20 | 22.07423 | 8.73811 | | | | 24.622 | |
| 21 | −46.00024 | 0.90000 | 1.772499 | 49.60 | 0.5521 | 21.288 | −21.359 |
| 22 | 26.14240 | 4.04203 | 1.846660 | 23.78 | 0.6034 | 21.985 | 24.438 |
| 23 | −96.70044 | 2.91044 | | | | 22.088 | |
| 24 | −20.39226 | 0.90000 | 1.800999 | 34.97 | 0.5863 | 22.088 | −89.160 |
| 25 | −29.02640 | (Variable) | | | | 23.053 | |
| 26 | −33.53567 | 0.90000 | 1.729157 | 54.68 | 0.5444 | 23.727 | −29.601 |
| 27 | 62.00299 | 2.73134 | 1.846660 | 23.78 | 0.6205 | 25.908 | 73.336 |
| 28 | 5426.95120 | (Variable) | | | | 26.494 | |
| 29 (Stop) | ∞ | 1.04258 | | | | 27.557 | |
| 30 | 144.60763 | 5.80564 | 1.834807 | 42.71 | 0.5642 | 29.049 | 38.100 |
| 31 | −40.31316 | 0.20000 | | | | 29.778 | |
| 32 | 140.01330 | 2.90947 | 1.570989 | 50.80 | 0.5588 | 29.573 | 116.796 |
| 33 | −127.51474 | 0.20000 | | | | 29.431 | |
| 34 | 62.82013 | 7.44444 | 1.496999 | 81.54 | 0.5374 | 28.583 | 43.611 |
| 35 | −31.93064 | 1.20000 | 2.000690 | 25.46 | 0.6133 | 27.614 | −30.706 |
| 36 | 1097.65571 | 0.20000 | | | | 27.561 | |
| 37 | 27.33320 | 3.43062 | 1.531717 | 48.84 | 0.5630 | 27.568 | 130.948 |
| 38 | 42.89669 | 17.98679 | | | | 26.842 | |
| 39 | −77.25420 | 4.44564 | 1.487490 | 70.23 | 0.5300 | 23.060 | 306.323 |
| 40 | −51.93660 | 20.78154 | | | | 22.786 | |
| 41 | 72.70188 | 7.72582 | 1.487490 | 70.23 | 0.5300 | 25.172 | 30.867 |
| 42 | −18.39119 | 0.85000 | 1.953750 | 32.32 | 0.5898 | 25.094 | −21.994 |
| 43 | −145.10189 | 2.61020 | | | | 27.091 | |
| 44 | 837.85153 | 6.19253 | 2.102050 | 16.77 | 0.6721 | 29.071 | 32.378 |
| 45 | −37.66305 | 0.85000 | 2.000690 | 25.46 | 0.6133 | 29.817 | −29.178 |
| 46 | 136.96902 | 0.19086 | | | | 30.863 | |
| 47 | 42.04543 | 7.61002 | 1.487490 | 70.23 | 0.5300 | 32.756 | 52.334 |
| 48 | −61.55333 | 33.54000 | | | | 33.050 | |
| Image plane | ∞ | | | | | | |

Aspherical surface data

First surface

K = 1.16599e+000   A4 = 2.14949e−007   A6 = −3.88534e−011   A8 = 1.50332e−014

Ninth surface

K = −9.49193e+000   A4 = 5.68085e−007   A6 = 2.51185e−010   A8 = 5.19688e−014

Nineteenth surface

K = −4.37435e+002   A4 = 1.00143e−005   A6 = −1.61464e−008   A8 = 2.99969e−011

Various data
Zoom ratio 5.00

| | Wide angle | Intermediate | Telephoto |
|---|---|---|---|
| Focal length | 15.00 | 35.00 | 75.00 |
| F number | 3.00 | 3.00 | 3.00 |
| Half angle of field | 46.03 | 23.96 | 11.71 |
| Image height | 15.55 | 15.55 | 15.55 |
| Total lens length | 300.20 | 300.20 | 300.20 |
| BF | 33.54 | 33.54 | 33.54 |

-continued

<Numerical Embodiment 2>
Unit: mm

|  |  |  |  |
|---|---|---|---|
| d18 | 0.99 | 21.34 | 32.89 |
| d25 | 32.46 | 9.59 | 1.98 |
| d28 | 2.70 | 5.23 | 1.28 |
| Entrance pupil position | 50.74 | 66.16 | 86.04 |
| Exit pupil position | −158.40 | −158.40 | −158.40 |
| Front principal point position | 64.57 | 94.78 | 131.73 |
| Rear principal point position | 18.54 | −1.46 | −41.46 |

Zoom lens unit data

| Unit | First surface | Focal length | Lens structure length | Front principal point position | Rear principal point position |
|---|---|---|---|---|---|
| 1 | 1 | 32.00 | 116.42 | 59.75 | 30.90 |
| 2 | 19 | −18.80 | 18.79 | 3.92 | −10.58 |
| 3 | 26 | −50.00 | 3.63 | −0.04 | −2.03 |
| 4 | 30 | 40.41 | 90.63 | 22.45 | −102.31 |

<Numerical Embodiment 3>
Unit: mm

Surface data

| Surface number | r | d | nd | vd | θgF | Effective diameter | Focal length |
|---|---|---|---|---|---|---|---|
| 1 | 1169.97001 | 3.20000 | 1.772499 | 49.60 | 0.5521 | 96.196 | −86.637 |
| 2 | 63.51741 | 23.65253 |  |  |  | 81.952 |  |
| 3 | −120.65898 | 2.70000 | 1.772499 | 49.60 | 0.5521 | 81.536 | −153.974 |
| 4 | 12736.29646 | 0.19644 |  |  |  | 83.190 |  |
| 5 | 137.03668 | 5.93946 | 1.922860 | 20.88 | 0.6282 | 85.308 | 253.532 |
| 6 | 318.82080 | 1.99862 |  |  |  | 84.987 |  |
| 7 | 271.65559 | 14.52319 | 1.620411 | 60.29 | 0.5426 | 84.829 | 126.774 |
| 8* | −109.03750 | 0.19636 |  |  |  | 84.334 |  |
| 9 | 1217.78701 | 11.61409 | 1.496999 | 81.54 | 0.5374 | 78.550 | 168.129 |
| 10 | −89.71276 | 2.50000 | 1.800000 | 29.84 | 0.6017 | 78.057 | −155.348 |
| 11 | −320.04558 | 7.41270 |  |  |  | 77.803 |  |
| 12 | 112.52390 | 2.50000 | 1.737999 | 32.26 | 0.5899 | 76.449 | −159.641 |
| 13 | 57.21267 | 18.30702 | 1.496999 | 81.54 | 0.5374 | 73.743 | 97.085 |
| 14 | −280.48528 | 0.20000 |  |  |  | 73.551 |  |
| 15 | 101.84132 | 9.22993 | 1.537150 | 74.81 | 0.5390 | 71.243 | 165.923 |
| 16 | −709.19180 | 0.20000 |  |  |  | 70.430 |  |
| 17 | 83.33061 | 5.90316 | 1.790000 | 45.50 | 0.5720 | 64.795 | 195.921 |
| 18 | 173.80844 | (Variable) |  |  |  | 63.045 |  |
| 19* | 61.54916 | 1.20000 | 1.882997 | 40.76 | 0.5667 | 29.211 | −28.504 |
| 20 | 17.77319 | 5.41316 |  |  |  | 24.205 |  |
| 21 | −159.39579 | 4.20515 | 1.846660 | 23.78 | 0.6034 | 24.051 | 32.622 |
| 22 | −24.02808 | 0.70000 | 1.772499 | 49.60 | 0.5521 | 23.552 | −36.395 |
| 23 | −162.83076 | 2.58431 |  |  |  | 22.313 |  |
| 24 | −23.84544 | 0.70000 | 1.729157 | 54.68 | 0.5444 | 22.322 | −29.063 |
| 25 | 200.55833 | 0.16000 |  |  |  | 24.087 |  |
| 26 | 58.45160 | 4.05153 | 1.654115 | 39.70 | 0.5737 | 25.225 | 47.356 |
| 27 | −64.90617 | (Variable) |  |  |  | 25.690 |  |
| 28 | −33.60198 | 0.90000 | 1.651597 | 58.55 | 0.5426 | 26.193 | −40.205 |
| 29 | 122.39841 | 2.45535 | 1.808095 | 22.76 | 0.6307 | 28.396 | 116.449 |
| 30 | −422.01783 | (Variable) |  |  |  | 28.992 |  |
| 31 (Stop) | ∞ | 1.29499 |  |  |  | 35.175 |  |
| 32 | 937.43324 | 4.48116 | 1.754998 | 52.32 | 0.5476 | 36.289 | 74.579 |
| 33 | −60.07159 | 0.20000 |  |  |  | 36.843 |  |
| 34 | 68.90288 | 5.17787 | 1.618000 | 63.33 | 0.5441 | 38.045 | 80.550 |
| 35 | 176.59285 | 0.20000 |  |  |  | 37.907 |  |
| 36 | 76.80512 | 5.15355 | 1.496999 | 81.54 | 0.5374 | 36.900 | 95.188 |
| 37 | −121.35769 | 1.20000 | 2.001000 | 29.13 | 0.5997 | 36.351 | −94.686 |
| 38 | 451.54241 | 0.19951 |  |  |  | 35.813 |  |
| 39 | 43.80046 | 10.46440 | 1.516330 | 64.14 | 0.5352 | 34.809 | 48.610 |
| 40 | −54.46084 | 1.10000 | 1.772499 | 49.60 | 0.5521 | 32.722 | −43.222 |
| 41 | 88.14685 | 23.84474 |  |  |  | 31.202 |  |
| 42 | 49.48699 | 4.85470 | 1.487490 | 70.23 | 0.5300 | 25.163 | 49.788 |
| 43 | −46.40636 | 0.19996 |  |  |  | 25.061 |  |
| 44 | 28.21280 | 5.77563 | 1.487490 | 70.23 | 0.5300 | 23.317 | 34.245 |
| 45 | −38.45968 | 1.00000 | 2.000690 | 25.46 | 0.6133 | 22.439 | −15.479 |
| 46 | 26.68305 | 2.54412 |  |  |  | 21.327 |  |
| 47 | 271.15033 | 6.98468 | 1.808095 | 22.76 | 0.6307 | 21.567 | 19.111 |

-continued

<Numerical Embodiment 3>
Unit: mm

| | | | | | | | |
|---|---|---|---|---|---|---|---|
| 48 | −16.36352 | 1.00000 | 1.882997 | 40.76 | 0.5667 | 22.077 | −17.554 |
| 49 | 339.47363 | 7.60841 | | | | 23.513 | |
| 50 | 35.22725 | 4.97126 | 1.487490 | 70.23 | 0.5300 | 29.657 | 67.719 |
| 51 | −529.25312 | 37.90000 | | | | 29.720 | |
| Image plane | ∞ | | | | | | |

Aspherical surface data

Eighth surface

K = 7.46975e−001   A4 = 1.99891e−007   A6 = 6.90199e−011   A8 = −1.88943e−013
A10 = 2.85379e−016   A12 = −2.31761e−019   A14 = 9.51659e−023   A16 = −1.55553e−026

Nineteenth surface

K = 5.13907e+000   A4 = 1.02312e−006   A6 = −1.14340e−008   A8 = 4.59324e−011
A10 = −3.79212e−013   A12 = 1.38269e−015   A14 = −1.51499e−018   A16 = −1.86650e−021

Various data
Zoom ratio 8.00

| | Wide angle | Intermediate | Telephoto |
|---|---|---|---|
| Focal length | 20.00 | 60.00 | 160.00 |
| F number | 2.80 | 2.80 | 3.60 |
| Half angle of field | 37.87 | 14.53 | 5.55 |
| Image height | 15.55 | 15.55 | 15.55 |
| Total lens length | 310.03 | 310.03 | 310.03 |
| BF | 37.90 | 37.90 | 37.90 |
| d18 | 0.69 | 30.37 | 44.35 |
| d27 | 41.14 | 7.95 | 5.96 |
| d30 | 9.40 | 12.91 | 0.93 |
| Entrance pupil position | 59.82 | 110.55 | 190.03 |
| Exit pupil position | −86.03 | −86.03 | −86.03 |
| Front principal point position | 76.59 | 141.50 | 143.45 |
| Rear principal point position | 17.90 | −22.10 | −122.10 |

Zoom lens unit data

| Unit | First surface | Focal length | Lens structure length | Front principal point position | Rear principal point position |
|---|---|---|---|---|---|
| 1 | 1 | 52.10 | 110.27 | 60.89 | 19.92 |
| 2 | 19 | −21.50 | 19.01 | 2.12 | −12.13 |
| 3 | 28 | −62.00 | 3.36 | −0.27 | −2.18 |
| 4 | 32 | 37.40 | 86.96 | 7.45 | −74.61 |

<Numerical Embodiment 4>
Unit: mm

Surface data

| Surface number | r | d | nd | vd | θgF | Effective diameter | Focal length |
|---|---|---|---|---|---|---|---|
| 1 | 133.81883 | 3.00000 | 1.772499 | 49.60 | 0.5521 | 90.057 | −87.880 |
| 2 | 44.73925 | 23.87215 | | | | 72.971 | |
| 3 | −167.36766 | 2.50000 | 1.772499 | 49.60 | 0.5521 | 72.606 | −93.032 |
| 4 | 127.84286 | 1.91426 | | | | 72.647 | |
| 5 | 102.37636 | 7.51980 | 1.922860 | 20.88 | 0.6282 | 74.470 | 169.653 |
| 6 | 279.42399 | 1.64636 | | | | 74.063 | |
| 7* | 150.90630 | 8.70581 | 1.620411 | 60.29 | 0.5426 | 74.022 | 160.132 |
| 8 | −287.65662 | 8.66215 | | | | 73.699 | |
| 9 | 164.35762 | 9.37868 | 1.595220 | 67.74 | 0.5442 | 73.882 | 157.795 |
| 10 | −216.26086 | 0.20000 | | | | 73.584 | |
| 11 | 134.40933 | 2.00000 | 1.882210 | 23.78 | 0.6036 | 69.914 | −94.024 |
| 12 | 51.24522 | 16.88046 | 1.438750 | 94.93 | 0.5343 | 65.990 | 98.740 |
| 13 | −256.15857 | 0.20000 | | | | 66.035 | |
| 14 | 86.69121 | 12.31733 | 1.770000 | 54.50 | 0.5550 | 65.245 | 73.671 |
| 15 | −155.91296 | (Variable) | | | | 64.209 | |
| 16* | 42.60200 | 1.20000 | 1.834807 | 42.71 | 0.5642 | 31.339 | −35.032 |
| 17 | 17.17444 | 7.78247 | | | | 25.592 | |
| 18 | −44.84220 | 0.80000 | 1.729157 | 54.68 | 0.5444 | 25.316 | −33.000 |
| 19 | 52.81240 | 1.69099 | | | | 24.142 | |

-continued

<Numerical Embodiment 4>
Unit: mm

| | | | | | | | |
|---|---|---|---|---|---|---|---|
| 20 | 40.60240 | 3.82252 | 1.846660 | 23.78 | 0.6034 | 23.802 | 36.560 |
| 21 | −129.97366 | 2.63029 | | | | 23.556 | |
| 22 | −24.87045 | 0.90000 | 1.834807 | 42.71 | 0.5642 | 23.531 | −115.791 |
| 23 | −33.97396 | (Variable) | | | | 24.204 | |
| 24 | −27.10392 | 0.80000 | 1.639999 | 60.08 | 0.5370 | 24.578 | −35.634 |
| 25 | 149.20046 | 2.54968 | 1.808095 | 22.76 | 0.6307 | 26.593 | 104.102 |
| 26 | −195.97886 | (Variable) | | | | 27.185 | |
| 27 (Stop) | ∞ | 1.71552 | | | | 28.120 | |
| 28 | −466.88719 | 2.95712 | 1.772499 | 49.60 | 0.5521 | 29.050 | 97.620 |
| 29 | −65.37333 | 0.20000 | | | | 30.505 | |
| 30 | 264.38094 | 4.09823 | 1.589130 | 61.14 | 0.5406 | 30.292 | 77.252 |
| 31 | −54.91610 | 0.20000 | | | | 30.505 | |
| 32 | 72.98468 | 5.78813 | 1.516330 | 64.14 | 0.5352 | 30.050 | 52.941 |
| 33 | −42.77332 | 1.20000 | 2.000690 | 25.46 | 0.6133 | 29.708 | −44.919 |
| 34 | −758.89691 | 0.91730 | | | | 29.782 | |
| 35 | 29.21503 | 3.28414 | 1.516330 | 64.14 | 0.5352 | 29.785 | 178.749 |
| 36 | 41.03538 | 23.25738 | | | | 29.059 | |
| 37 | 64.82994 | 0.90000 | 1.953750 | 32.32 | 0.5898 | 24.567 | −36.795 |
| 38 | 22.72058 | 6.11702 | 1.808095 | 22.76 | 0.6307 | 24.367 | 22.735 |
| 39 | −89.12908 | 1.72046 | | | | 24.427 | |
| 40 | 47.08069 | 5.42141 | 1.438750 | 94.93 | 0.5343 | 23.755 | 43.655 |
| 41 | −31.28624 | 1.00000 | 1.805181 | 25.42 | 0.6161 | 23.307 | −19.730 |
| 42 | 33.35913 | 10.29550 | | | | 23.076 | |
| 43 | 35.83585 | 7.33475 | 1.487490 | 70.23 | 0.5300 | 29.594 | 44.835 |
| 44 | −52.71959 | 1.20000 | 1.834000 | 37.16 | 0.5775 | 29.689 | −130.968 |
| 45 | −102.35803 | 40.04000 | | | | 30.020 | |
| Image plane | ∞ | | | | | | |

Aspherical surface data

Seventh surface $K = -1.31886e+001$  $A4 = -3.33339e-007$  $A6 = -1.00548e-011$  $A8 = 1.93377e-014$
$A10 = -5.83498e-017$  $A12 = 1.05163e-019$  $A14 = -7.28030e-023$  $A16 = 1.81611e-026$ Sixteenth surface $K = -6.82246e+000$  $A4 = 1.53646e-005$  $A6 = -1.26474e-008$  $A8 = 3.57838e-011$
$A10 = -2.67322e-013$  $A12 = 2.11682e-015$  $A14 = -7.89376e-018$  $A16 = 1.19021e-020$ Various data
Zoom ratio 5.00

| | Wide angle | Intermediate | Telephoto |
|---|---|---|---|
| Focal length | 19.00 | 45.00 | 95.00 |
| F number | 2.70 | 2.70 | 2.70 |
| Half angle of field | 39.30 | 19.06 | 9.30 |
| Image height | 15.55 | 15.55 | 15.55 |
| Total lens length | 277.64 | 277.64 | 277.64 |
| BF | 40.04 | 40.04 | 40.04 |
| d15 | 0.70 | 22.76 | 34.43 |
| d23 | 28.12 | 6.05 | 3.57 |
| d26 | 10.20 | 10.21 | 1.02 |
| Entrance pupil position | 56.04 | 85.75 | 122.55 |
| Exit pupil position | −103.97 | −103.97 | −103.97 |
| Front principal point position | 72.53 | 116.69 | 154.88 |
| Rear principal point position | 21.04 | −4.96 | −54.96 |

Zoom lens unit data

| Unit | First surface | Focal length | Lens structure length | Front principal point position | Rear principal point position |
|---|---|---|---|---|---|
| 1 | 1 | 45.00 | 98.80 | 57.31 | 21.16 |
| 2 | 16 | −24.80 | 18.83 | 2.46 | −13.14 |
| 3 | 24 | −55.00 | 3.35 | −0.46 | −2.37 |
| 4 | 28 | 40.26 | 75.89 | 18.01 | −65.31 |

<Numerical Embodiment 5>
Unit: mm

Surface data

| Surface number | r | d | nd | vd | θgF | Effective diameter | Focal length |
|---|---|---|---|---|---|---|---|
| 1 | 194.96209 | 3.00000 | 1.772499 | 49.60 | 0.5521 | 88.491 | −88.490 |
| 2 | 50.45050 | 23.69287 | | 0.00 | | 73.351 | |
| 3 | −101.22704 | 2.50000 | 1.772499 | 49.60 | 0.5521 | 72.885 | −111.690 |
| 4 | 610.40944 | 0.19704 | | 0.00 | | 74.054 | |
| 5 | 112.46576 | 6.06429 | 1.922860 | 18.90 | 0.6495 | 75.732 | 194.404 |
| 6 | 287.65098 | 4.86350 | | 0.00 | | 75.347 | |
| 7 | −1837.00765 | 7.27013 | 1.651597 | 58.55 | 0.5426 | 75.086 | 230.062 |
| 8 | −139.33725 | 0.20000 | | 0.00 | | 74.929 | |
| 9 | −472.70380 | 4.65675 | 1.595220 | 67.74 | 0.5442 | 72.970 | 424.413 |
| 10 | −165.62101 | 8.66201 | | 0.00 | | 72.465 | |
| 11 | −192.35145 | 6.46656 | 1.537150 | 74.81 | 0.5390 | 66.913 | 268.083 |
| 12 | −83.47137 | 0.99766 | | 0.00 | | 66.556 | |
| 13 | −78.26046 | 2.50000 | 1.800000 | 29.84 | 0.6017 | 66.067 | −270.007 |
| 14 | −123.92169 | 0.20000 | | 0.00 | | 67.015 | |
| 15 | 144.80685 | 2.00000 | 1.846660 | 23.78 | 0.6034 | 66.705 | −142.303 |
| 16 | 65.69817 | 13.00429 | 1.496999 | 81.54 | 0.5374 | 65.115 | 106.901 |
| 17 | −263.45069 | 0.20000 | | 0.00 | | 65.049 | |
| 18 | 131.23177 | 9.46925 | 1.496999 | 81.54 | 0.5374 | 64.015 | 146.867 |
| 19 | −161.59164 | 0.20000 | | 0.00 | | 63.356 | |
| 20 | 61.37933 | 6.25108 | 1.730000 | 49.00 | 0.5575 | 56.603 | 136.191 |
| 21 | 152.31744 | (Variable) | | 0.00 | | 55.097 | |
| 22* | 123.35380 | 1.20000 | 1.882997 | 40.76 | 0.5667 | 32.089 | −28.857 |
| 23 | 21.12344 | 6.38054 | | 0.00 | | 26.928 | |
| 24 | −167.62168 | 4.33940 | 1.846660 | 23.78 | 0.6034 | 26.240 | 54.777 |
| 25 | −37.04472 | 0.80000 | 1.772499 | 49.60 | 0.5521 | 25.538 | −98.748 |
| 26 | −72.37210 | (Variable) | | 0.00 | | 24.901 | |
| 27 | −25.91341 | 0.80000 | 1.834807 | 42.71 | 0.5642 | 24.536 | −28.139 |
| 28 | 270.81861 | 0.16000 | | 0.00 | | 24.869 | |
| 29 | 87.77809 | 3.31174 | 1.846660 | 23.78 | 0.6034 | 25.043 | 51.048 |
| 30 | −85.31340 | (Variable) | | 0.00 | | 25.023 | |
| 31 | −31.89775 | 0.90000 | 1.696797 | 55.53 | 0.5433 | 25.027 | −34.635 |
| 32 | 102.09398 | 2.46844 | 1.808095 | 22.76 | 0.6307 | 27.236 | 92.767 |
| 33 | −290.19380 | (Variable) | | 0.00 | | 27.788 | |
| 34 (Stop) | ∞ | 1.28219 | | 0.00 | | 32.549 | |
| 35 | ∞ | 5.00427 | 1.816000 | 46.62 | 0.5568 | 33.538 | 57.344 |
| 36 | −47.02989 | 0.20000 | | 0.00 | | 34.253 | |
| 37 | 121.66426 | 4.00000 | 1.589130 | 61.14 | 0.5406 | 34.746 | 118.312 |
| 38 | −162.68134 | 0.20000 | | 0.00 | | 34.670 | |
| 39 | 53.21128 | 7.67575 | 1.496999 | 81.54 | 0.5374 | 33.912 | 52.816 |
| 40 | −49.60645 | 1.20000 | 1.846660 | 23.78 | 0.6205 | 33.197 | −43.964 |
| 41 | 156.92657 | 0.19575 | | 0.00 | | 32.533 | |
| 42 | 24.49279 | 7.89416 | 1.518229 | 58.90 | 0.5456 | 32.141 | 61.163 |
| 43 | 94.58401 | 1.10000 | 1.772499 | 49.60 | 0.5521 | 30.289 | −78.875 |
| 44 | 36.97714 | 21.17659 | | 0.00 | | 28.740 | |
| 45 | 55.51715 | 6.46969 | 1.805181 | 25.42 | 0.6161 | 22.663 | 21.616 |
| 46 | −24.35459 | 0.90000 | 1.882997 | 40.76 | 0.5667 | 22.365 | −19.627 |
| 47 | 62.39214 | 8.45794 | | 0.00 | | 22.051 | |
| 48 | 118.59896 | 6.86089 | 1.438750 | 94.93 | 0.5343 | 23.601 | 34.489 |
| 49 | −17.08788 | 1.00000 | 2.003300 | 28.27 | 0.5980 | 23.707 | −26.491 |
| 50 | −48.53765 | 7.21499 | | 0.00 | | 25.917 | |
| 51 | 55.89004 | 6.66022 | 1.487490 | 70.23 | 0.5300 | 32.106 | 59.353 |
| 52 | −58.04968 | 39.99000 | | 0.00 | | 32.395 | |
| Image plane | ∞ | | | | | | |

Aspherical surface data

Twenty-second surface

K = 3.15185e+001   A4 = 3.02637e−006   A6 = −5.86837e−009   A8 = −4.69891e−012

Various data
Zoom ratio 6.50

| | Wide angle | Intermediate | Telephoto |
|---|---|---|---|
| Focal length | 18.50 | 45.00 | 120.25 |
| F number | 2.80 | 2.80 | 3.43 |
| Half angle of field | 40.05 | 19.06 | 7.37 |
| Image height | 15.55 | 15.55 | 15.55 |
| Total lens length | 300.07 | 300.07 | 300.07 |
| BF | 39.99 | 39.99 | 39.99 |
| d21 | 0.68 | 25.34 | 41.04 |
| d26 | 2.39 | 4.03 | 4.61 |

-continued

<Numerical Embodiment 5>
Unit: mm

| d30 | 39.84 | 10.82 | 3.22 |
|---|---|---|---|
| d33 | 6.92 | 9.65 | 0.98 |
| Entrance pupil position | 54.12 | 84.17 | 136.89 |
| Exit pupil position | −165.72 | −165.72 | −165.72 |
| Front principal point position | 70.96 | 119.33 | 186.85 |
| Rear principal point position | 21.49 | −5.01 | −80.26 |

Zoom lens unit data

| Unit | First surface | Focal length | Lens structure length | Front principal point position | Rear principal point position |
|---|---|---|---|---|---|
| 1 | 1 | 46.00 | 102.40 | 59.41 | 25.26 |
| 2 | 22 | −42.00 | 12.72 | −2.77 | −13.83 |
| 3 | 27 | −67.00 | 4.27 | −1.89 | −4.39 |
| 4 | 31 | −56.00 | 3.37 | −0.33 | −2.23 |
| 5 | 35 | 46.94 | 86.21 | 25.62 | −102.68 |

TABLE 1

| | | Numerical Embodiment | | | | |
|---|---|---|---|---|---|---|
| | | 1 | 2 | 3 | 4 | 5 |
| | fn1 | 42.85 | 27.99 | 35.01 | 38.09 | 31.69 |
| | fn2 | 183.81 | 124.13 | 200.15 | 109.91 | 125.53 |
| | fn11 | 550.51 | 130.95 | −1769.52 | 178.75 | 189.31 |
| | f1 | 57.00 | 32.00 | 52.10 | 45.00 | 46.00 |
| | f11 | −56.03 | −43.99 | −67.42 | −57.14 | −61.80 |
| | f13 | 73.69 | 49.34 | 68.45 | 55.33 | 60.83 |
| Conditional Expression | | | | | | |
| (1) | βnw | −1.96 | −2.36 | −2.01 | −1.62 | −2.04 |
| (2) | βn2 | 0.39 | 0.67 | 0.69 | 0.47 | 0.72 |
| (3) | fn1/fn2 | 0.23 | 0.23 | 0.17 | 0.35 | 0.25 |
| (4) | |fn1/fn11| | 0.08 | 0.21 | 0.02 | 0.21 | 0.17 |
| (5) | θ2 | 0.628 | 0.672 | 0.631 | 0.631 | 0.616 |
| (6) | vd2 | 20.9 | 16.8 | 22.8 | 22.8 | 25.4 |
| (7) | vd2a | 75.15 | 70.23 | 70.23 | 82.58 | 82.58 |
| (8) | f1/fw | 3.17 | 2.13 | 2.61 | 2.37 | 2.49 |
| (9) | f11/f1 | −0.98 | −1.37 | −1.29 | −1.27 | −1.34 |
| (10) | f13/f11 | −1.32 | −1.12 | −1.02 | −0.97 | −0.98 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions This application claims the benefit of Japanese Patent Application No. 2013-234389, filed Nov. 12, 2013, which is hereby incorporated by reference herein in its entirety.

What is claimed is:

1. A zoom lens, comprising, in order from an object side to an image side:
    a first lens unit having a positive refractive power which does not move for zooming;
    a second lens unit having a negative refractive power which moves during zooming; and
    an N-th lens unit having a positive refractive power which does not move for zooming and is arranged closest to the image side,
    wherein the N-th lens unit comprises, in order from an object side to an image side:
    a first sub-lens unit; and
    a second sub-lens unit configured to be able to move in an optical axis direction, and
    wherein the following conditional expressions are satisfied:

$-2.70 < \beta nw < -1.45$; and $0 < \beta n2 < 0.75$, where $\beta nw$ represents a lateral magnification at a wide angle end of the N-th lens unit and $\beta n2$ represents a lateral magnification at a wide angle end of the second sub-lens unit when an axial ray enters from infinity in a state in which focus is at the infinity.

2. A zoom lens according to claim 1, wherein the following conditional expression is satisfied:

$0 < fn1/fn2 < 0.45$, where fn1 represents a focal length of the first sub-lens unit, and fn2 represents a focal length of the second sub lens unit.

3. A zoom lens according to claim 1,
    wherein a lens closest to the image side of the first sub-lens unit comprises a convex lens or a cemented lens, and
    wherein the following conditional expression is satisfied:

$|fn1/fn11| < 0.3$, where fn11 represents a focal length of the lens closest to the image side of the first sub-lens unit.

4. A zoom lens according to claim 1, wherein the following conditional expression is satisfied:

$0.58 < \theta2 < 0.70$, where θ2 represents a partial dispersion ratio of a first convex lens, which has the smallest Abbe number with respect to a d-line among convex lenses included in the second sub-lens unit,
    provided, that the partial dispersion ratio θ is expressed as follows:

$\theta = (Ng - NF)/(NF - NC)$, where Ng, NF, and NC respectively represent a refractive index for a g-line, a refractive index for an F-line, and a refractive index for a C-line, and
    an Abbe number vd with respect to the d-line is expressed as follows;

$vd = (Nd - 1)/(NF - NC)$, where Nd represents a refractive index for the d-line, NC represents the refractive index for the C-line, and NF represents the refractive index for the F-line.

5. A zoom lens according to claim 1, wherein the following conditional expressions are satisfied:

$$15 < vd2 < 30; \text{ and}$$

$$65 < vd2a < 85,$$

where vd2 represents an Abbe number with respect to d-line of a first convex lens, which has the smallest Abbe number with respect to the d-line among convex lenses included in the second sub-lens unit, and vd2a represents an average Abbe number with respect to the d-line of the convex lenses other than the first convex lens, provided that an Abbe number vd with respect to the d-line among convex lenses included in the second sub-lens unit is expressed as follows:

$$vd = (Nd-1)/(NF-NC),$$

where NF represents a refractive index for an F-line, Nd represents a refractive index for the d-line, and NC represents a refractive index for a C-line.

6. A zoom lens according to claim 1,
wherein the first lens unit comprises:
a first sub-lens unit having negative refractive power which does not move for focusing;
second sub-lens unit having a positive refractive power which moves to the image side during focusing from an infinity side to a close range side; and
a third sub-lens unit having positive refractive power, and
wherein the following conditional expression is satisfied:

$$1.5 < f1/fw < 3.5,$$

were f1 represents a focal length of the first lens unit, and fw represents a focal length at the wide angle end of the zoom lens.

7. A zoom lens according to claim 1,
wherein the first lens unit comprises:
first sub-lens unit having to negative refractive power which does not move for focusing;
a second sub lens unit having a positive refractive power which moves to the image side during focusing from an infinity side to a close range side; and
a third sub-lens unit having a positive refractive power, and
wherein the following conditional expressions are satisfied:

$$-1.5 < f11/f1 < -0.9,$$

where f1 represents a focal length of the first lens unit, and f11 represents a focal length of the first sub-lens unit of the first lens unit.

8. A zoom lens according to claim 1,
wherein the first lens unit comprises:
a first sub-lens unit having a negative refractive power which does not move for focusing;
a second sub-lens unit having a positive refractive power which moves to the image side during focusing from an infinity side to a close range side; and
a third sub-lens unit having a positive refractive power, and
wherein the following conditional expressions are satisfied:

$$-1.5 < f13/f11 < -0.9,$$

were f11 represents a focal length of the first sub-lens unit of the first lens unit, and f13 represents a focal length of the third sub-lens unit of the first lens unit.

9. A zoom lens according to claim 1, wherein the second sub-lens unit is configured to be able to move in an optical axis direction for macro photography or flange back adjustment.

10. An image pickup apparatus, comprising:
a zoom lens comprising, in order from an object side to an image side:
a first lens unit having a positive refractive power which does not move for zooming;
a second lens unit having a negative refractive power which moves during zooming; and
an N-th lens unit having a positive refractive power which does not move for zooming and is arranged closest to the image side,
wherein the N-th lens unit comprises, in order from an object side to an image side:
a first sub-lens unit; and
a second sub-lens unit configured to be able to move in an optical axis direction, and
wherein the following conditional expressions are satisfied:

$$-2.70 < \beta nw < -1.45; \text{ and}$$

$$0 < \beta n2 < 0.75,$$

where βnw represents a lateral magnification at a wide angle end of the N-th lens unit and βn2 represents a lateral magnification at a wide angle end of the second sub-lens unit when an axial ray enters from infinity in a state in which focus is at the infinity; and
a solid-state image pick-up element for receiving an image formed by the zoom lens.

* * * * *